(12) United States Patent
Clark

(10) Patent No.: US 11,890,156 B2
(45) Date of Patent: *Feb. 6, 2024

(54) DENTAL MATRIX AND DENTAL MATRIX SYSTEM

(71) Applicant: David J. Clark, Tacoma, WA (US)

(72) Inventor: David J. Clark, Tacoma, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,363

(22) Filed: Sep. 10, 2021

(65) Prior Publication Data
US 2021/0401544 A1 Dec. 30, 2021

Related U.S. Application Data

(63) Continuation of application No. 15/128,249, filed as application No. PCT/US2015/022524 on Mar. 25, 2015, now Pat. No. 11,116,603.

(60) Provisional application No. 61/970,010, filed on Mar. 25, 2014.

(51) Int. Cl.
A61C 5/85 (2017.01)

(52) U.S. Cl.
CPC ....................................... A61C 5/85 (2017.02)

(58) Field of Classification Search
CPC ....................................................... A61C 5/85
USPC ............................................................ 433/39
See application file for complete search history.

(56) References Cited

U.S. PATENT DOCUMENTS

| | | | |
|---|---|---|---|
| 2,611,182 A * | 9/1952 | Tofflemire | A61C 5/85 |
| | | | 433/39 |
| 2,790,238 A * | 4/1957 | Trangmar | A61C 5/85 |
| | | | 433/39 |
| 3,108,377 A | 10/1963 | Meyer | |
| 3,842,505 A | 10/1974 | Eames | |
| 3,921,299 A | 11/1975 | Lazarus | |
| 4,024,643 A | 5/1977 | Eisenberg | |
| 4,523,909 A | 6/1985 | Lazarus | |
| 4,536,155 A | 8/1985 | Ireland | |
| 4,553,937 A | 11/1985 | Ropers | |
| 4,601,662 A | 7/1986 | Galler | |
| 4,704,087 A * | 11/1987 | Dragan | A61C 5/85 |
| | | | 433/39 |
| 4,718,849 A | 1/1988 | von Weissenfluh et al. | |
| 4,781,583 A | 11/1988 | Lazarus | |
| 4,997,367 A | 3/1991 | Kassel | |
| 5,114,341 A | 5/1992 | Kassel | |
| 5,425,635 A | 6/1995 | Croll | |

(Continued)

FOREIGN PATENT DOCUMENTS

| | | | | |
|---|---|---|---|---|
| DE | 3323085 A1 | 1/1985 | | |
| WO | WO-9927866 A1 * | 6/1999 | ............... | A61C 5/80 |

OTHER PUBLICATIONS

Edelhoff et al., Tooth Structure Removal Associated with Various Preparation Designs for Posterior Teeth, International Journal of Periodontics & Restorative Dentistry, 2002, 22(3):241-249.

(Continued)

Primary Examiner — Matthew M Nelson

(74) Attorney, Agent, or Firm — Quarles & Brady LLP

(57) ABSTRACT

Methods for the restoration of a decayed portion of a tooth and dental matrices that may be used in the methods for the restoration of a decayed portion of a tooth are disclosed. Methods for direct elective composite additive crowning and veneering of teeth that may or may not have decay or previous restorations are also disclosed.

20 Claims, 29 Drawing Sheets

(56) References Cited

U.S. PATENT DOCUMENTS

| | | | |
|---|---|---|---|
| 5,460,525 A | 10/1995 | Rashid | |
| 5,501,595 A | 3/1996 | Brorson | |
| 5,622,496 A | 4/1997 | Champagne | |
| 5,730,592 A | 3/1998 | Meyer | |
| 5,788,487 A * | 8/1998 | Meyer | A61C 5/85 433/39 |
| 5,807,101 A | 9/1998 | Scalzo | |
| 5,975,906 A | 11/1999 | Knutson | |
| 6,079,978 A | 6/2000 | Kunkel | |
| 6,142,778 A * | 11/2000 | Summer | A61C 5/85 433/39 |
| 6,220,858 B1 * | 4/2001 | McKenna | A61C 5/88 433/149 |
| 6,350,122 B1 * | 2/2002 | Meyer | A61C 5/85 433/39 |
| 6,509,540 B1 * | 1/2003 | Summer | A61C 5/85 433/39 |
| 6,619,956 B1 * | 9/2003 | Weir | A61C 5/85 433/149 |
| 6,712,608 B2 | 3/2004 | Bills | |
| 8,393,897 B2 | 3/2013 | Clark | |
| 9,192,452 B2 * | 11/2015 | Fatiny | A61C 5/85 |
| 2005/0089814 A1 * | 4/2005 | Slone | A61C 5/85 433/39 |
| 2005/0244787 A1 * | 11/2005 | Summer | A61C 5/85 433/149 |
| 2005/0255428 A1 * | 11/2005 | Coopersmith | A61C 5/85 433/222.1 |
| 2005/0287491 A1 * | 12/2005 | Slone | A61C 5/85 433/39 |
| 2006/0019217 A1 | 1/2006 | Yates | |
| 2007/0148613 A1 * | 6/2007 | Stoll | A61C 5/85 433/39 |
| 2007/0154860 A1 * | 7/2007 | Kerle | A61C 5/85 433/39 |
| 2008/0064002 A1 * | 3/2008 | Clark | A61C 5/88 433/39 |
| 2008/0064012 A1 | 3/2008 | Clark | |
| 2008/0187881 A1 * | 8/2008 | Rus | A61C 5/85 433/39 |
| 2009/0191505 A1 * | 7/2009 | Clark | A61C 5/50 433/226 |
| 2009/0208896 A1 * | 8/2009 | Clark | A61C 5/50 433/215 |
| 2011/0189629 A1 * | 8/2011 | Kilcher | A61C 5/85 433/226 |
| 2016/0220328 A1 * | 8/2016 | Clark | A61C 5/88 |
| 2017/0119499 A1 * | 5/2017 | Clark | A61C 5/85 |

OTHER PUBLICATIONS

Saunders et al., Prevalence of Periradicular Periodontitis Associated with Crowned Teeth in an Adult Scottish Subpopulation, British Dental Journal, 1998, 185(3):137-140.

International Search Report and Written Opinion dated Jun. 25, 2015 for International Application No. PCT/US2015/022524.

* cited by examiner

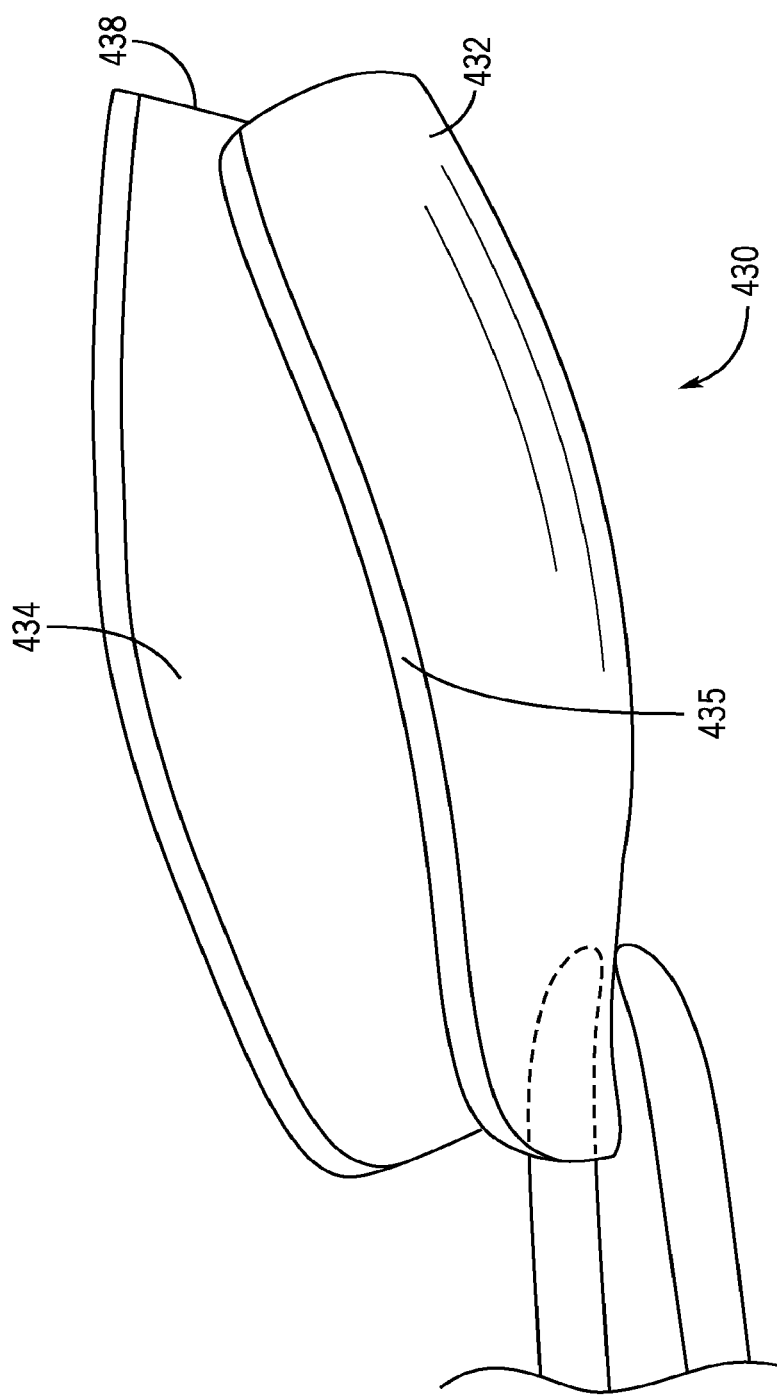

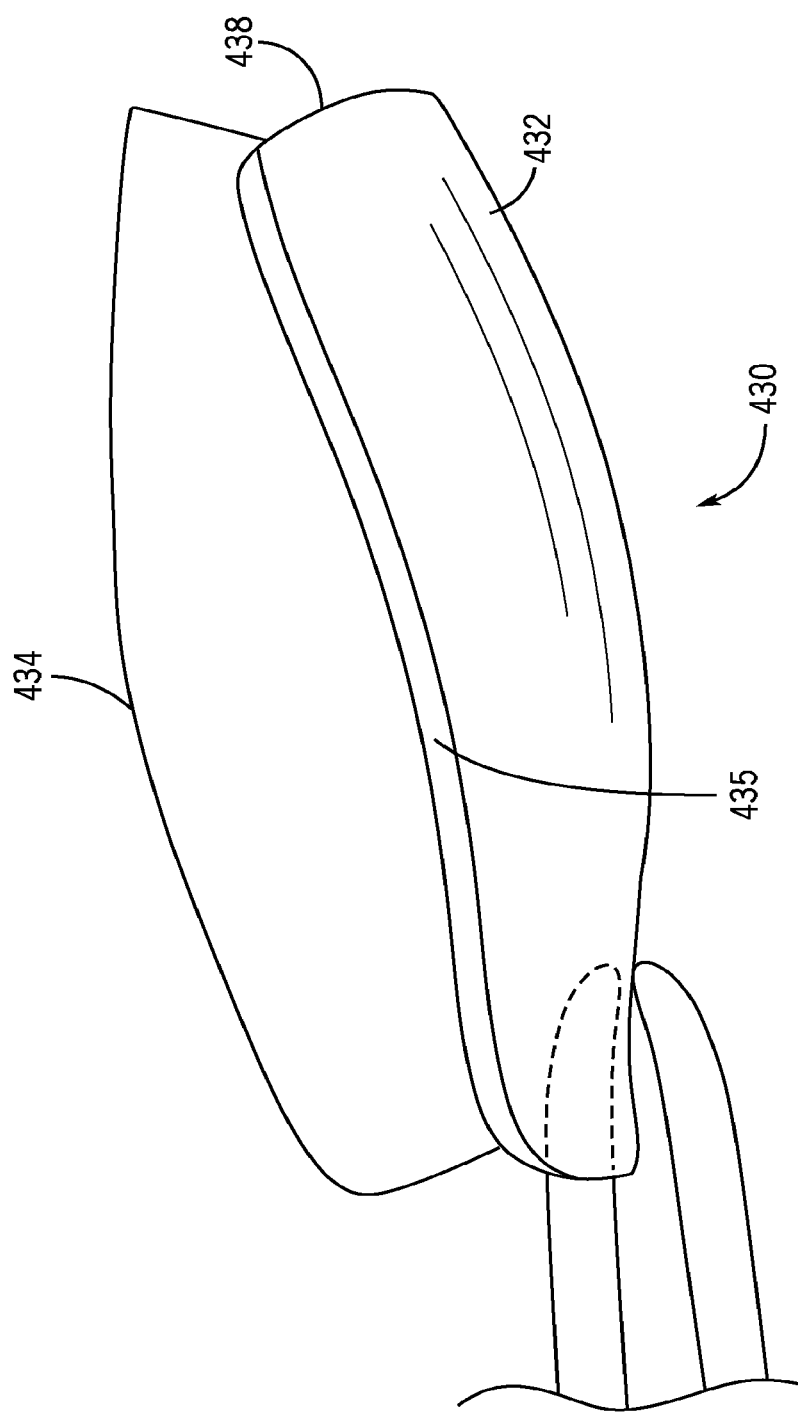

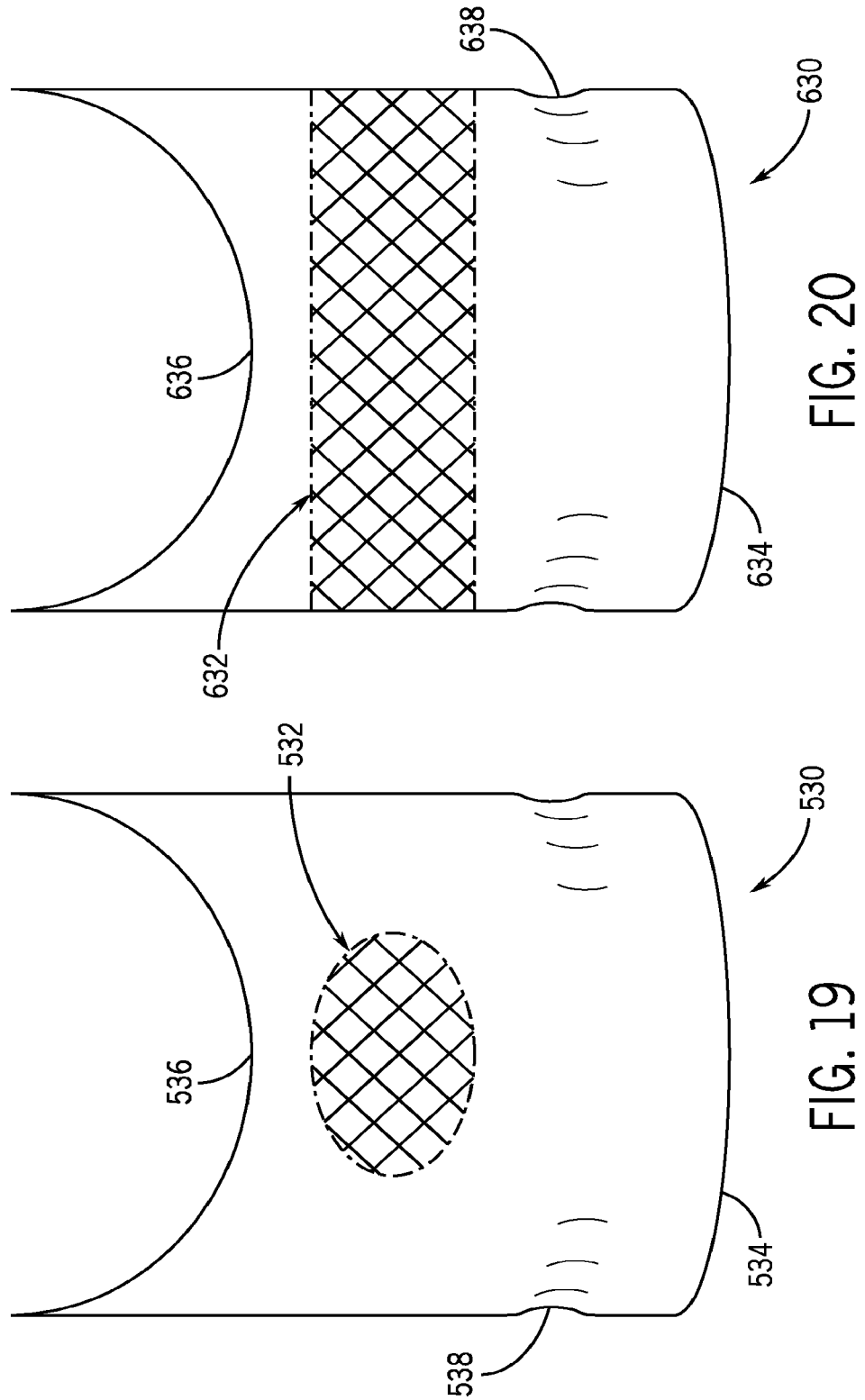

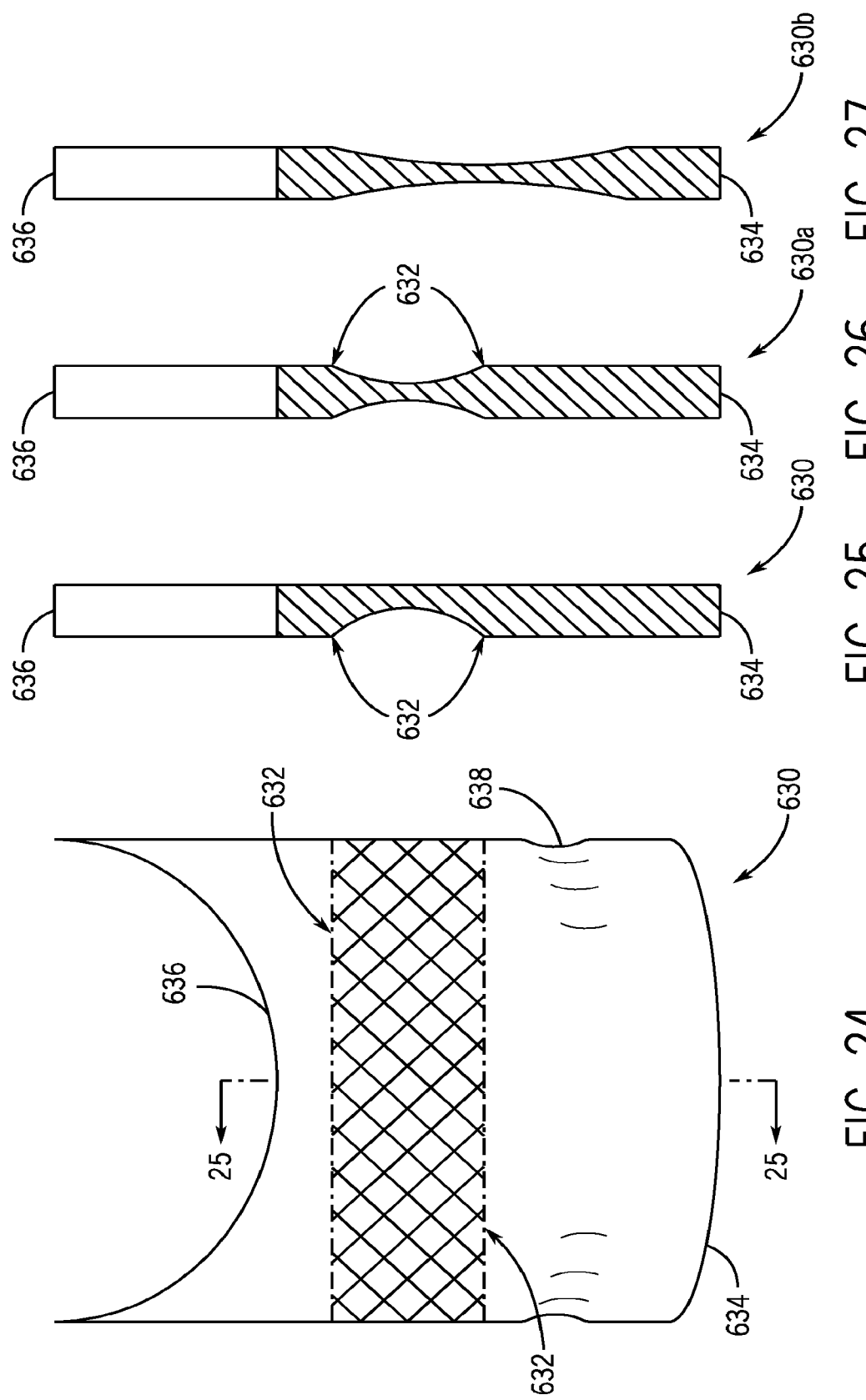

DENTAL MATRIX AND DENTAL MATRIX SYSTEM

CROSS-REFERENCES TO RELATED APPLICATIONS

This application is a continuation application of U.S. patent application Ser. No. 15/128,249 filed Sep. 22, 2016, which is a 371 application of PCT/US2015/022524 filed Mar. 25, 2015, which claims priority from U.S. Patent Application No. 61/970,010 filed Mar. 25, 2014.

STATEMENT REGARDING FEDERALLY SPONSORED RESEARCH

Not Applicable.

BACKGROUND OF THE INVENTION

1. Field of the Invention

The present invention relates to methods for the restoration of a decayed portion of a tooth or re-restoration of a previously filled tooth, and to dental matrices that may be used in the methods for the restoration of a decayed portion of an anterior tooth. It also relates to the elective composite additive crowning and veneering of teeth that may or may not have decay or previous restorations.

2. Description of the Related Art

Dental cavities that have spread to the dentin or have undergone cavitation are typically treated by removing the decayed portion of the tooth and thereafter filling the missing tooth structure with a restorative material such as silver (amalgam), white (resin), porcelain, or gold. Cavities that are located adjacent to neighboring teeth are called interproximal cavities.

When treating cavities, the dentist first removes the decayed portion of the tooth. In order to properly deposit the restorative material on the tooth without undesired leaking of the restorative material beyond the tooth, the dentist places a dental matrix around at least a portion of the tooth. The dental matrix may be a metallic or plastic strip, and when the matrix is placed around at least a portion of the tooth, the matrix acts as a form for the desired shape of the restored tooth. Various dental matrix bands are shown in U.S. Pat. Nos. 6,712,608, 6,619,956, 6,350,122, 6,142,778, 6,079,978, 5,975,906, 5,807,101, 5,730,592, 5,622,496, 5,501,595, 5,460,525, 5,425,635, 5,114,341, 4,997,367, 4,781,583, 4,718,849, 4,704,087, 4,601,662, 4,553,937, 4,536,155, 4,523,909, 4,024,643, 3,842,505, 3,108,377, 2,790,238 and 2,611,182, and U.S. Patent Application Publication Nos. 2006/0019217 and 2005/0089814. The disadvantages of these known matrix bands is that they are not truly anatomic and therefore, they must be conformed to the tooth by pressure or other means. As a result, these matrixes are inefficient in that more dentist time is needed to complete the restoration, and the final result may be a non-anatomic restoration. These matrices will also not allow the dentist to properly seat the matrix fully, resulting in gaps and voids and ledges in the subsequent near the gumline, which will result in recurrent decay and gingival irritation and periodontal disease and breakdown. The gingiva near these problems in the filling bleed easily and are unsightly with a reactive purplish color. Gingiva can be divided anatomically into marginal gingiva, attached gingiva, and interdental gingival papilla. The gingival zenith represents the most apical point at which each tooth emerges from the free gingival margin.

Humanoid posterior teeth and anterior teeth have several significant differences that demand unique features in the matrices required to retain the filling material when restoring an anterior tooth. FIGS. 1 and 2 show front and side views respectively of a human upper central incisor 11 having a root 12, a crown 13, and a root-crown junction 14. In the view of mesial surface in FIG. 2, significant undulation is shown in the root-crown junction 14. This roller coaster type rise and fall in the root-crown junction 14 can vary from 2 millimeters up to 5 millimeters. It is most pronounced at the midline and then flattens with each tooth as you move toward the posterior teeth. Although no two teeth are exactly the same, there are general trends and all anterior teeth exhibit this anatomic feature and all humanoids show a lessening of the rise and fall of the root-crown junction as you move posteriorly away from the midline toward the back of the back molar. Accommodating the slight rise and fall off the root-crown junction of the posterior tooth has not been necessary to achieve a good adaptation. This would explain why this feature is absent in commercially available matrices for posterior teeth.

Looking at FIG. 3, there is shown the mesial surface 16 of a left upper central incisor 11. In the past, a traditional flat clear matrix (e.g., Mylar™ plastic) strip 17 was placed after the cavity was prepared and often adapted with an interdental wedge or elastic spacer. As shown in FIG. 3, there have been problems with this previous technique. The problems with traditional clear Mylar™ plastic strips are that they are flat, and do not conform to the tooth. In this regard, FIG. 3 shows how the gingival edge 18 of the matrix 17 meets resistance at the gingival margin 19 when seating the matrix 17 in the matrix seating direction shown in FIG. 3. This leaves a palatal gap GP and a facial gap GF between the matrix 17 and the gingival margin 19 shown in FIG. 3. This can lead to undesired pivotal movement of the matrix 17 about the point where the matrix 17 contacts the gingival margin 19.

An anterior tooth has a complex shape with multiple curvatures. It is asymmetrical from facial to lingual and from mesial to distal. Sectional clear flat matrix strips for anterior teeth, such as that shown in FIG. 3, have been available. Fillings today are performed nearly universally with tooth colored filling materials (composite resin) and require a medium to contain the filling material inside the cavity preparation. These matrix strips are translucent, and typically made from Mylar™ plastic material that is thin and pliable.

Some problems with current flat plastic matrix strips for anterior teeth include: (1) the flat plastic matrix strips are flat (not anatomic), requiring crimping; (2) the flat plastic matrix strips require stabilizing with wedges or other devices; (3) the flat plastic matrix strips require further stabilizing with the operator's fingers or the dental assistant's fingers, and back to back fillings (two neighboring teeth with interproximal caries or failing fillings) present extreme challenges to manipulate four matrix ends simultaneously; (4) the flat plastic matrix strips require that the strip be "wrapped" to approximate the tooth after placement of filling material (such as a composite, glass ionomer, composite/glass ionomer mix) and prior to polymerization or light curing of the material; (5) time and energy is usually expended to remove excess and areas of bulky, non anatomic regions of the composite filling material because of the residual contour created by the flat, non anatomic clear strip; (6) the above mentioned finishing can lead to gum trauma and can lead to iatrogenic gouging of tooth surface and tooth surfaces of neighboring teeth; (7) the above mentioned finishing disturbs the smooth and highly cured surface left by the plastic strip and while this disturbed surface can be polished, it is virtually impossible to return to the original smoothness and these surfaces are manifested clinically as a matte finish, rough finish, or jagged finish and these three imperfect finish types collect bacteria more readily, are more prone to discoloration and predispose the tooth to decay and predispose the periodontal attachment (gum and bone) to deterioration from the destructive nature of periodontal diseases; (8) the flat matrix strip combined with a wedge often results in a flat contoured filling that has an unsightly gapping (dark triangle) between the teeth at the gum attachment area such that food and bacterial accumulation are also more common in these gaps; and (9) the pre curved sectional matrix bands for posterior teeth are too short to be used easily on anterior teeth as matrix bands for posterior teeth range from 4.5 millimeters to 6.5 millimeters in height, and the needs of anterior teeth range approximately from 8 millimeters to 13 millimeters in height.

One of the challenges of doing an adequate filling is to have a matrix that is stiff and strong enough to withstand insertion and wedging pressure, and at the same time be thin enough so that upon removal of the matrix, the contact between the tooth being restored and the adjacent tooth is tight enough to avoid food impaction. "Open Contacts" are a significant problem with the advent of composite (tooth colored) fillings in comparison to silver amalgam fillings. This is mainly because the composite resins are not as packable as amalgam and therefore less expansion pressure is placed laterally on the matrix with the composite resin filling materials. Many solutions have been tried with limited success. Therefore an advance is needed.

In addition, historically it has been a common practice in dentistry to prepare human teeth for coverage with partial or full crowns. In this process, typically the patient is anesthetized and the tooth is ground down to a peg shape for three main reasons. The first reason was to remove decay and old filling materials in the case where the tooth was too weak to support itself and retain the filling, or also to cosmetically cover a dark, worn or misshapen tooth. The second reason for the grinding down of the tooth was to give 1 to 2 millimeters of space for traditional crown materials such as a gold or porcelain that have certain thickness requirements for fabrication and strength. These crowns or caps are made from replicas of the tooth in the form of actual stone (plaster) models or more recently virtual models. This is referred to as an indirect restoration (cap or crown or veneer). Once the crown is returned to the dentist, it is cemented over the stump of the tooth. The third reason to grind the teeth to a tapered peg or "teepee" shape was for path of insertion of the crown on a tooth that is essentially the inverse of the necessary shape, i.e., the tooth is thickest at the incisal edge but this roundness and fullness must be eliminated to allow the margins (edges) of the crown access to the gum line. See FIGS. 28 to 30 wherein T1 are anterior teeth before grinding down for an indirect restoration, T2 are anterior teeth after grinding down for an indirect restoration, and T3 are anterior teeth after the indirect restoration. The chewing edge of the tooth is "incisal" for anterior teeth or "occlusal" for posterior teeth.

The process of grinding the tooth down is damaging to the tooth however. A full crown preparation removes, on average, 75% of the actual volume of the tooth above the gum line; in other words, the area of the tooth to be covered with a crown must be reduced volumetrically by 75%. See FIG. 31 which is from Edelhoff et al., "Tooth Structure Removal Associated with Various Preparation Designs for Posterior Teeth" *Int. J Periodontics Restorative Dent* 2002: Vol 22: 3: 240-249. Truly, if patients were aware of this level of mutilation of the tooth, they would be less apt to accept treatment. The pulp (or nerve) inside of the tooth is connected to the outside of the tooth via dentin tubules, and this extent of tooth removal often creates sensitivity and pulpal death of the nerve which will require subsequent root canal therapy which demands making a hole in the crown that was recently placed. The morbidity rate for the pulp of the tooth has been shown in studies to be as high as 20%. See, Saunders et al., "Prevalence of Periradicular Periodontitis Associated with Crowned Teeth in a Scottish Population", *Br Dent J* 1998; 185: 137-140.

Large fillings alone cannot be a substitute for when full coverage of a tooth is required. With advancements in adhesive materials and resin composite restorative filling materials, the composite can be bonded directly to the tooth directly without the use of cement or need for an indirect technique. The Bioclear® brand matrix (available at http://www.bioclearmatrix.com) has advanced this direct restoration with an injection molding process (see U.S. Patent Application Publication No. 2008/0064012) and tooth shaped (anatomic) matrices, and, for example, U.S. Pat. No. 8,393,897 for esthetic recontouring of the tooth to close diastemas (tooth gapping) or gum gapping (i.e., treatment of dental black triangles) using direct adhesion of the composite to the tooth. Even with these advancements, there is still a need for further advancements in the craft of coverage of the tooth with a veneer of restorative material.

Thus, there is a need for improved dental matrices, particularly dental matrices intended for anterior teeth.

SUMMARY OF THE INVENTION

The invention meets the foregoing needs by providing improved methods, dental matrices, and kits for the restoration of a decayed portion of a tooth, particularly an anterior tooth.

In one aspect, the invention provides a dental matrix for use when placing a restorative material on a tooth. The matrix includes a non-flat sectional strip having a first end and an opposed second end, the strip being shaped to conform to at least a portion of a surface of the tooth. The strip includes a cut away inwardly directed toward a central portion of the strip, the cut away defining a first section of a gingival edge of the strip, the first section of the gingival edge corresponding in shape to a coronally directed projection of gingival papilla adjacent the tooth and underlying periodontal and bony attachments of the tooth. The strip is structured to be retained on the tooth without the use of any attachment elements extending from or contacting a facial, lingual, mesial, or distal surface of the strip when the matrix is placed on the tooth.

A second section of the gingival edge may correspond in shape to a portion of gingival margin adjacent a facial surface of the tooth. A second section of the gingival edge may correspond in shape to a portion of gingival margin adjacent a facial surface of the tooth wherein the portion of gingival margin is on one side or both sides of the gingival zenith. The coronally directed projection of gingival papilla may be adjacent an incisor and/or a canine tooth. The coronally directed projection of gingival papilla may be in a mesial view of the tooth. The coronally directed projection of gingival papilla may be in a distal view of the tooth.

The strip can have a length from the first end to the second end such that the strip can cover at least 90 degrees around side surfaces of the tooth covered by the strip. The matrix may be translucent. The strip may be pre-curved and universal for any interproximal surface of any anterior tooth. The matrix may be side specific for an anterior tooth. The matrix may be tooth specific for an anterior tooth. The matrix may be tooth and surface specific for an anterior tooth. The matrix may be fully anatomic for an anterior tooth. The matrix may be anatomically shaped such that the matrix is self stabilizing and hands free for the anterior tooth. The matrix may be fully anatomic for a posterior tooth. The matrix may be anatomically shaped such that the matrix is self stabilizing and hands free for the posterior tooth.

In the dental matrix, at least a section of the gingival edge of the matrix may be curved inwardly and a spring-like nature of memory of shape of material comprising the strip provides tension to retain the matrix once it snaps onto the tooth. The section of the gingival edge of the matrix that is curved inwardly may be a facial section and/or a lingual section and/or a mesial section and/or a distal section. The gingival edge of the matrix may be curved inwardly a non-anatomic fashion. The gingival edge of the matrix may be curved inwardly an anatomic fashion. No wedging device or retainer or clamp device is needed to stabilize the matrix. The matrix may also include an additional feature for active hands-free wedge-free retention of the matrix, the feature being selected from (i) adhesive, (ii) static electricity charge, (iii) light cure adhesive, (iv) gingival harpoons, (v) mechanical prominences that lock under a contact or soft tissue, (vi) a first configuration wherein the matrix wraps past 180 degrees curving in an anatomic fashion, (vii) a second configuration wherein a radius of the entire matrix is smaller than an anatomic radius of the tooth creating tension to stabilize the matrix, and (viii) any combinations thereof.

The dental matrix may be used in a method for the restoration of a tooth having an original shape including a surface. The method may include the steps of: removing a portion of the surface of the tooth to form a hollow cavity preparation; surrounding the removed portion of the surface of the tooth with the matrix; placing a restorative material into the hollow cavity preparation; and curing the restorative material contained in the cavity preparation.

The dental matrix may be used in another method for the restoration of a tooth having an original shape including a surface. The method may include the steps of: (a) surrounding a portion of the surface of the tooth with the matrix; (b) placing a restorative material on the tooth; and (c) curing the restorative material. This version of the method does not remove any tooth structure before step (a), and the method adds fullness to beautify the tooth with a better shape or color by adding the restorative material to some or all of the tooth.

In another aspect, the invention provides a dental matrix system for providing a form for direct complete veneering of a tooth. The veneering may be over 60% of the surface area of the tooth, or over 70% of the surface area of the tooth, or over 80% of the surface area of the tooth, or over 90% of the surface area of the tooth, or over 95% of the surface area of the tooth, or 100% of the surface area of the tooth. The dental matrix system includes a first matrix including a first strip of material having a length from a first end to a second end, the length of the first strip of material being sufficient to cover at least 120 degrees of the tooth, and the first end of the first strip of material defining a vertical edge of the first matrix. The dental matrix system includes a second matrix including a second strip of material having a length from a first end to a second end, the length of the second strip of material being sufficient to cover at least 120 degrees of the tooth, and the first end of the second strip of material defining a vertical edge of the second matrix. The first matrix and the second matrix are dimensioned to create a form for injecting with an adhesive dental restorative material for overmolding or crowning or veneering when the first matrix and the second matrix are placed on the tooth, and the first matrix and the second matrix are dimensioned such that a first portion of the first matrix and a second portion of the second matrix overlap when the first matrix and the second matrix are placed on the tooth. The dental matrix system allows for injection of adhesive veneering material to overmold the tooth.

The length of the first strip of material may sufficient to cover at least 130 degrees of the tooth, or at least 140 degrees of the tooth, or at least 150 degrees of the tooth, or at least 160 degrees of the tooth, or at least 170 degrees of the tooth, or at least 180 degrees of the tooth. The length of the second strip of material may sufficient to cover at least 130 degrees of the tooth, or at least 140 degrees of the tooth, or at least 150 degrees of the tooth, or at least 160 degrees of the tooth, or at least 170 degrees of the tooth, or at least 180 degrees of the tooth.

In the dental matrix system, the vertical edge of the first matrix and the vertical edge of the second matrix may be dimensioned to create an aperture that exposes the tooth when the first matrix and the second matrix are placed on the tooth. The aperture exposes the tooth from gingival margin to a point on a facial surface of the tooth when the first matrix and the second matrix are placed on the tooth. In the dental matrix system, the first matrix and the second matrix may be dimensioned to create a slit that exposes the tooth from gingival margin to an incisal or an occlusal surface of the tooth when the first matrix and the second matrix are placed on the tooth. The slit may be formed from the vertical edge of the first matrix and the vertical edge of the second matrix, and the vertical edge of the first matrix and the vertical edge of the second matrix are a uniform distance apart when the first matrix and the second matrix are placed on the tooth.

At least one of the first strip and the second strip may include an inwardly directed cut away that corresponds in shape to a projection of gingival papilla adjacent the tooth and underlying periodontal and bony attachments of the tooth. At least one of the first strip and the second strip can have a variable thickness with a thinner contact area. The first matrix and the second matrix may be dimensioned such that 45% to 125% of surface area of the tooth is covered when the first matrix and the second matrix are placed on the tooth. The first matrix and the second matrix may be dimensioned such that 65% to 95% of surface area of the tooth is covered when the first matrix and the second matrix are placed on the tooth. The first matrix and the second matrix may be dimensioned such that at least 100% of surface area of the tooth is covered when the first matrix and the second matrix are placed on the tooth. The dental matrix system may include a third matrix dimensioned to engage the first matrix and the second matrix and close off an opening created by the first matrix and the second matrix opposite gingival margin when the first matrix and the second matrix are placed on the tooth. The first matrix and the second matrix may comprise a pair of matrices of the system, wherein one of the pair of matrices may be dimensioned to conform to a distal surface of the tooth, and the other of the pair of matrices being dimensioned may be conform to a mesial surface of the tooth. The invention is not limited to two or three matrix systems. For example, four or more matrices may be used in the system.

The dental matrix system provides a form for veneering of a tooth wherein a first matrix and a second matrix create a form for direct complete veneering of a tooth. A two piece matrix of the invention is designed to allow a complete direct complete crowning (veneering) of the human tooth. A matrix or a pair of matrices overlap to allow insertion of dental restorative material around a bulbous tooth. A dental matrix or a pair of dental matrices that have a partition or vent hole allow escape of air bubbles and the lesser wetting composites as the heavier paste composite displaces them during an injection molding technique such as that described in U.S. Patent Application Publication No. 2008/0064012. In one version of the technique, the dental practitioner only injects dental restorative material from the incisal. In yet another technique, the dental practitioner injects dental restorative material from facial and/or incisal and/or lingual.

In the dental matrix system, a pair of fully anatomic matrices can be used in making accurately sized and shaped veneered teeth directly on the tooth. The crowning/veneering dental matrices may be thin enough (less than 100 microns, preferably less than 70 microns, most preferably less than 60 microns) to allow overmolding of the tooth that upon their removal the contact with the neighboring tooth will be snug and snap the floss normally. The crowning/veneering dental matrices can slide 360 degrees between the tooth and gum, the depth of the sulcus around the tooth by virtue of fully anatomic shapes and a scallop roller coaster gingival shape.

The dental matrix system may include variable thickness matrices, thicker and stiffer in some areas to retain their shape during injection molding, thinner at the contact areas to achieve a snug contact after matrix removal.

In still another aspect, the invention provides a process for veneering of a tooth. The process may include the steps of: placing a first matrix and a second matrix on a tooth for providing a form for direct complete veneering of the tooth, wherein the first matrix and the second matrix are dimensioned such that a first portion of the first matrix and a second portion of the second matrix overlap when the first matrix and the second matrix are placed on the tooth; and direct overmolding of the tooth with an adhesive restorative material to perform a direct crown veneering of the tooth. The vertical edge of the first matrix and the vertical edge of the second matrix may be dimensioned to create an aperture that exposes the tooth when the first matrix and the second matrix are placed on the tooth. The first matrix and the second matrix may be dimensioned such that 45% to 125% of surface area of the tooth is covered when the first matrix and the second matrix are placed on the tooth.

The process provides for direct overmolding of the tooth with adhesive material to perform a direct crown/360 degree veneering of the tooth. It is a process of additive dentistry where none of the tooth needs to be cut away for logistics, the tooth is just cleaned and conditioned for adhesion. The process provides for cosmetic or structural enhancement of a human tooth with direct overmolding of the tooth for cosmetic or structural enhancement.

The process for veneering of a human tooth provide for direct overmolding of a tooth that has need of strengthening because of previous fillings and or new decay or fractures or wear or congenital defects or undersized teeth where a traditional filling does not provide a comprehensive structural remedy wherein the decay and old fillings are removed but no other tooth structure is removed before the crowning of the tooth.

The dental matrix system is advantageous because the pair of matrices are designed to be used together. A two piece dental matrix system is a universal system because the crowning/veneering dental matrices expand apart or move together depending on the width of the teeth, instead of binding on a wide tooth or "accordioning" at the facial and/or lingual where the contact areas of the neighboring tooth would push the matrix in on itself. The dental matrix system may include a third matrix piece that closes off and forms the incisal portion of the dental matrix system.

A veneer/crown kit may be provided as a pair (or sets of pairs for a full case of six or more teeth) of matrices, one for distal, one for mesial with between 45% to 125% of the tooth surfaces covered, wherein the less than 100% version would allow injection of restorative material without teasing the edges apart, the 100% and more version could have a hole-orifice for injection and a vent on the other side.

In yet another aspect, the invention provides a dental matrix for use when placing a restorative material on a tooth. The dental matrix may include a sectional strip having a first end and an opposed second end. The strip may be shaped to conform to at least a portion of a surface of the tooth, and the strip may be pre-curved such that the strip can cover from 90 degrees up to 360 degrees around side surfaces of the tooth when the matrix is placed on the tooth. The strip has a variable thickness with a thinner contact area in a center region of the strip. The strip can have abrupt thinning in the thinner contact area. The thinner contact area may be offset toward occlusal in relation to peripheral areas of the matrix. The thinner contact area may extend from the first end to the second end of the strip. The strip may include a cut away inwardly directed toward a central portion of the strip, wherein the cut away defines a first section of a gingival edge of the strip, and the first section of the gingival edge corresponds in shape to a coronally directed projection of gingival papilla adjacent the tooth and underlying periodontal and bony attachments of the tooth. The thinner contact area may be defined by a first recessed area in a first side of the strip and a second recessed area in an opposite second side of the strip. The strip can comprise a metallic material. The contact area may be pre-burnished to create a thin, soft, flexible contact area.

In another aspect, the invention provides a dental matrix for use when placing a restorative material on a tooth. The dental matrix includes a metallic sectional strip having a first end and an opposed second end, the strip being shaped to conform to at least a portion of a surface of the tooth, the strip being pre-curved such that the strip can cover from 90 degrees up to 360 degrees around side surfaces of the tooth when the matrix is placed on the tooth, wherein the strip has a variable thickness with a thinner contact area in a center region of the strip. In one version, the contact area has been pre-burnished.

The dental matrix may be used in a method for the restoration of a tooth having an original shape including a surface. The method may include the steps of: removing a portion of the surface of the tooth to form a hollow cavity preparation; surrounding the removed portion of the surface of the tooth with a matrix of the present invention; placing a restorative material into the hollow cavity preparation; and curing the restorative material contained in the cavity preparation.

The features, aspects, and advantages of the present invention will become better understood upon consideration of the following detailed description, drawings and appended claims.

BRIEF DESCRIPTION OF THE DRAWINGS

FIG. 10b is a top cross-sectional view of the prior sectional dental matrix of FIG. 10a taken along line 10b-10b of FIG. 10a.

FIG. 11b is a top cross-sectional view of the sectional dental matrix of FIG. 11a taken along line 11b-11b of FIG. 11a.

FIG. 12b is a top cross-sectional view of the sectional dental matrix of FIG. 12a taken along line 12b-12b of FIG. 12a.

FIG. 17 is a perspective side view of the anterior dental matrix of FIG. 13.

FIG. 18 is another perspective side view of the anterior dental matrix of FIG. 13.

FIG. 19 is a side view of another example embodiment of a sectional hands free and self stabilizing anterior dental matrix according to the invention.

FIG. 20 is a side view of another example embodiment of a sectional hands free and self stabilizing anterior dental matrix according to the invention.

FIG. 24 is a side view of the sectional hands free and self stabilizing anterior dental matrix of FIG. 20.

FIG. 25 is a cross-sectional view of the sectional dental matrix of FIG. 24 taken along line 25-25 of FIG. 25.

FIG. 26 is a cross-sectional view, similar to FIG. 25, of another sectional dental matrix according to the invention.

FIG. 27 is a cross-sectional view, similar to FIG. 25, of yet another sectional dental matrix according to the invention.

Like reference numerals will be used to refer to like parts from Figure to Figure in the following description of the drawings.

DETAILED DESCRIPTION OF THE INVENTION

The invention provides improved methods, dental matrices, and kits for the restoration of a decayed portion of an anterior or posterior tooth.

In an example method according to the invention for the restoration of a tooth, the dentist locates a tooth having a cavity. A hollow cavity preparation is prepared in a tooth. The tools and techniques for forming the hollow cavity preparation are well known in the art and therefore will not be explained further.

In order to properly deposit the restorative material on the tooth without undesired leaking of the restorative material beyond the tooth, the dentist places a dental matrix around at least a portion of the tooth. In the invention, a sectional dental matrix is placed on the tooth. When the matrix is placed around at least a portion of the tooth, the matrix acts as a form for the desired shape of the restored tooth.

A light curable composite resin is then placed in the cavity preparation. The filled cavity preparation is then cured using a curing light such as high intensity light emitting diode (LED) lights, plasma-arc curing lights, halogen lights, and laser lights. The matrix is then removed, and the restored tooth is polished with discs, strips, and rubber tipped and carbide burs.

Various matrices are provided by the invention. Each matrix can be tooth specific, or the matrix can be tooth type specific, or the matrix can be tooth surface specific. By "tooth specific" it is meant that the matrix is configured to conform to the shape of the outer surface of the specific natural tooth being restored such as (without limitation) an upper left central incisor. By "tooth type specific" it is meant that the matrix is configured to conform to the shape of the outer surface of the specific type of natural tooth being restored such as (without limitation) an upper incisor. By "tooth surface specific" it is meant that the matrix is configured to conform to the shape of the outer surface of the specific natural tooth surface being restored such as (without limitation) an upper left incisor mesial surface.

Figure 1:
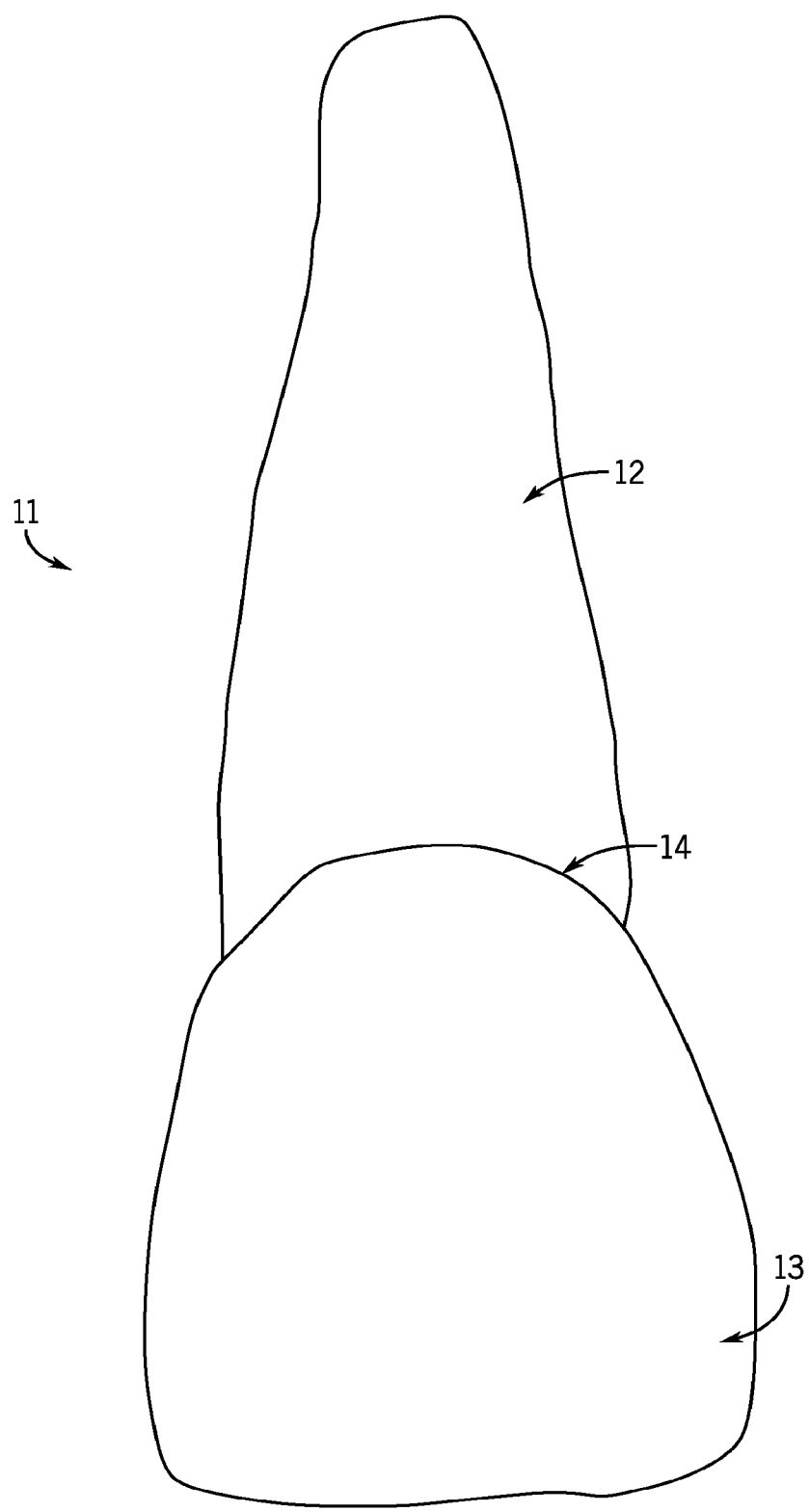
FIG. 1 is a front view of a human left upper central incisor.
Figure 2:
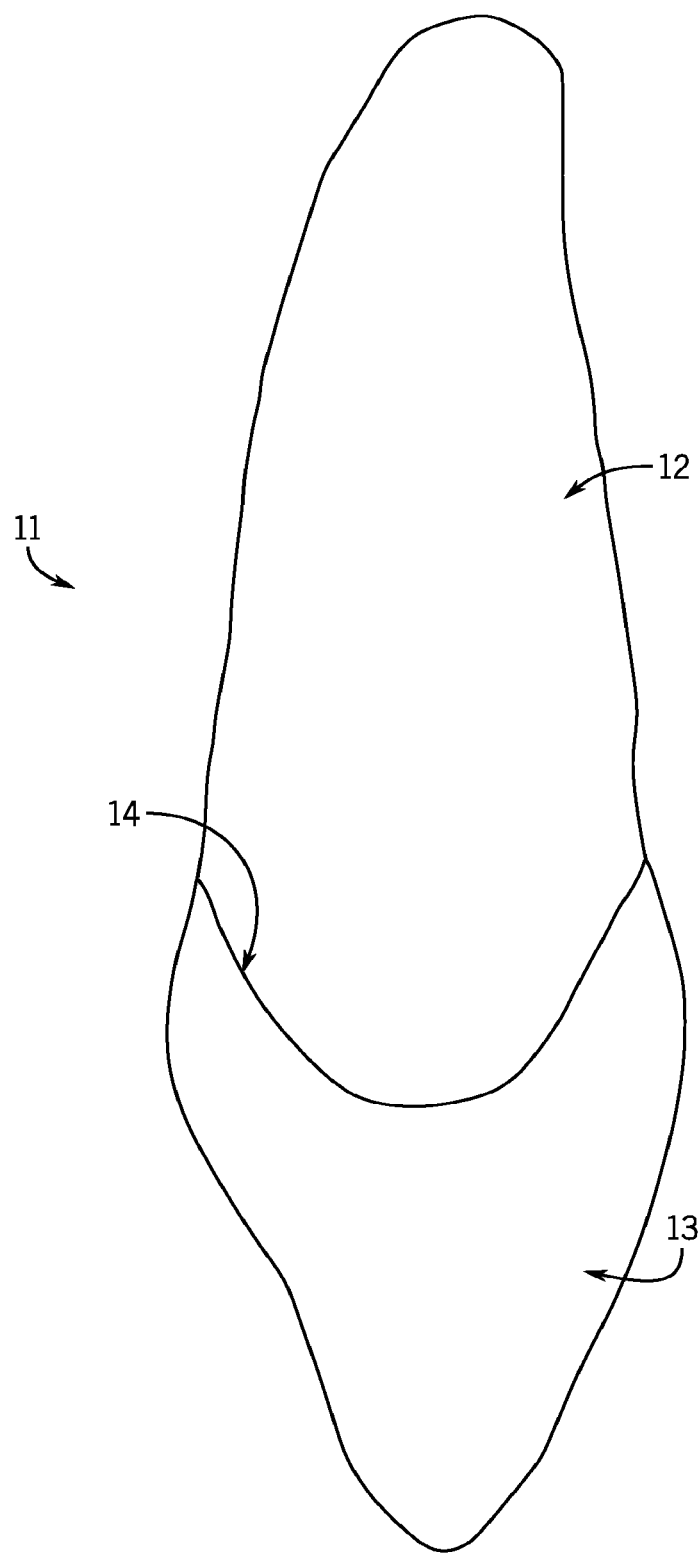
FIG. 2 is a side view of the human left central incisor of FIG. 1.
Figure 3:
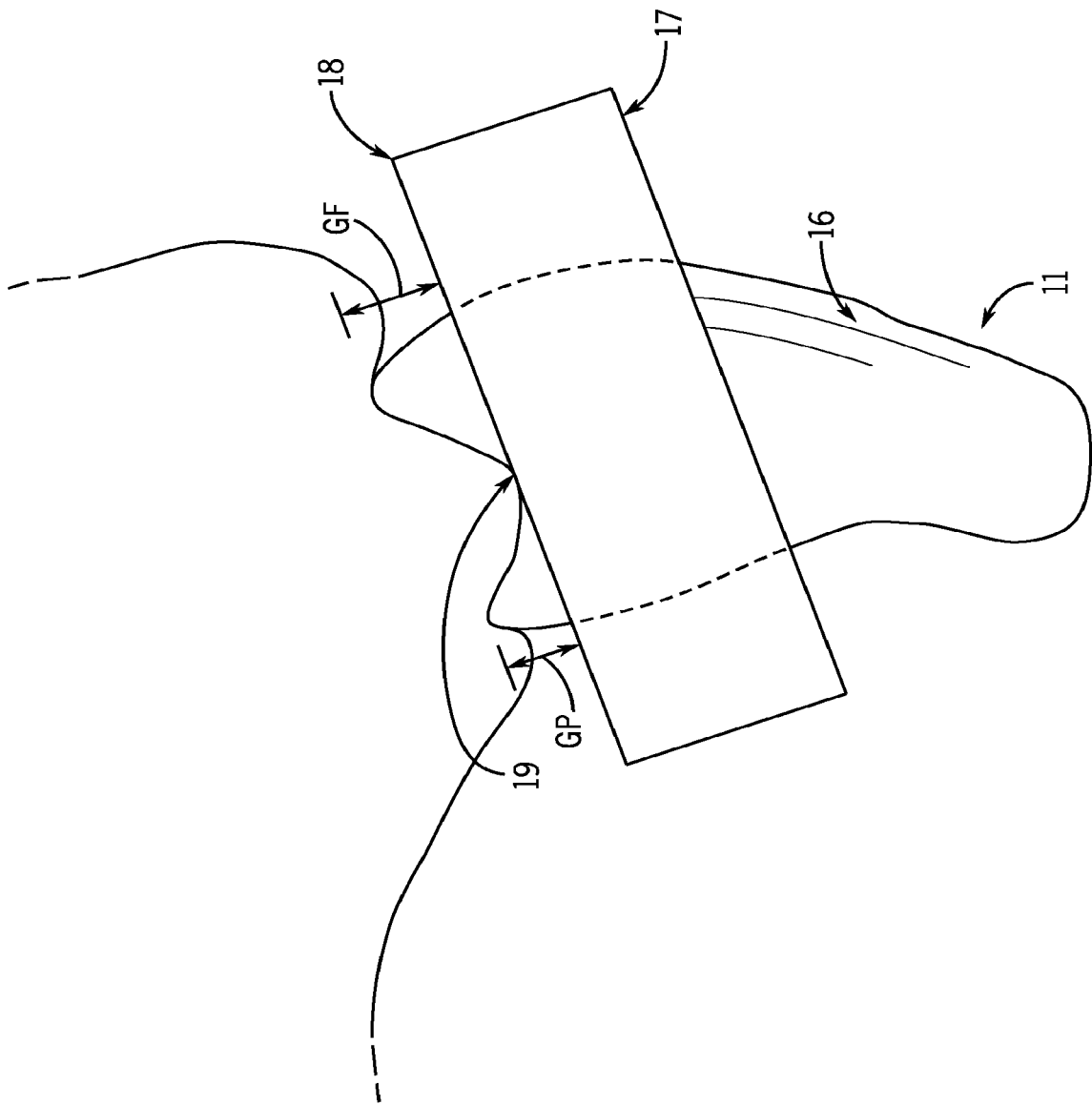
FIG. 3 is a side view similar to FIG. 2 showing a traditional flat strip matrix being seated on the left central incisor.
Figure 4:
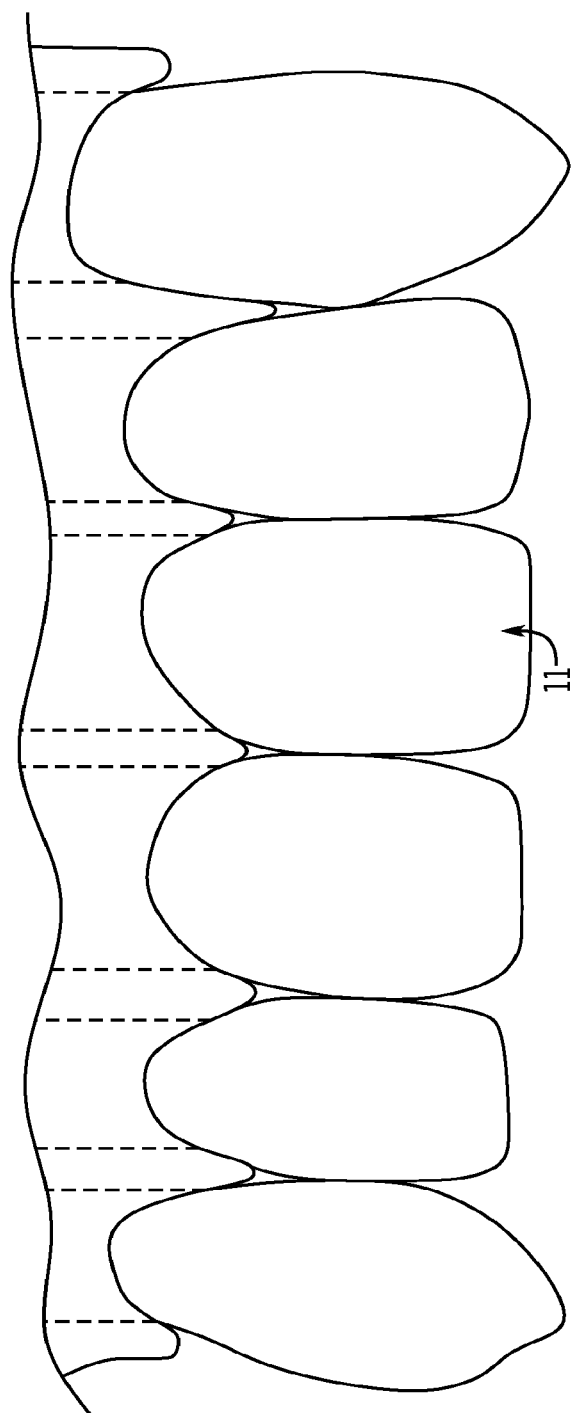
FIG. 4 is a front view of the top front teeth.
Figure 5:
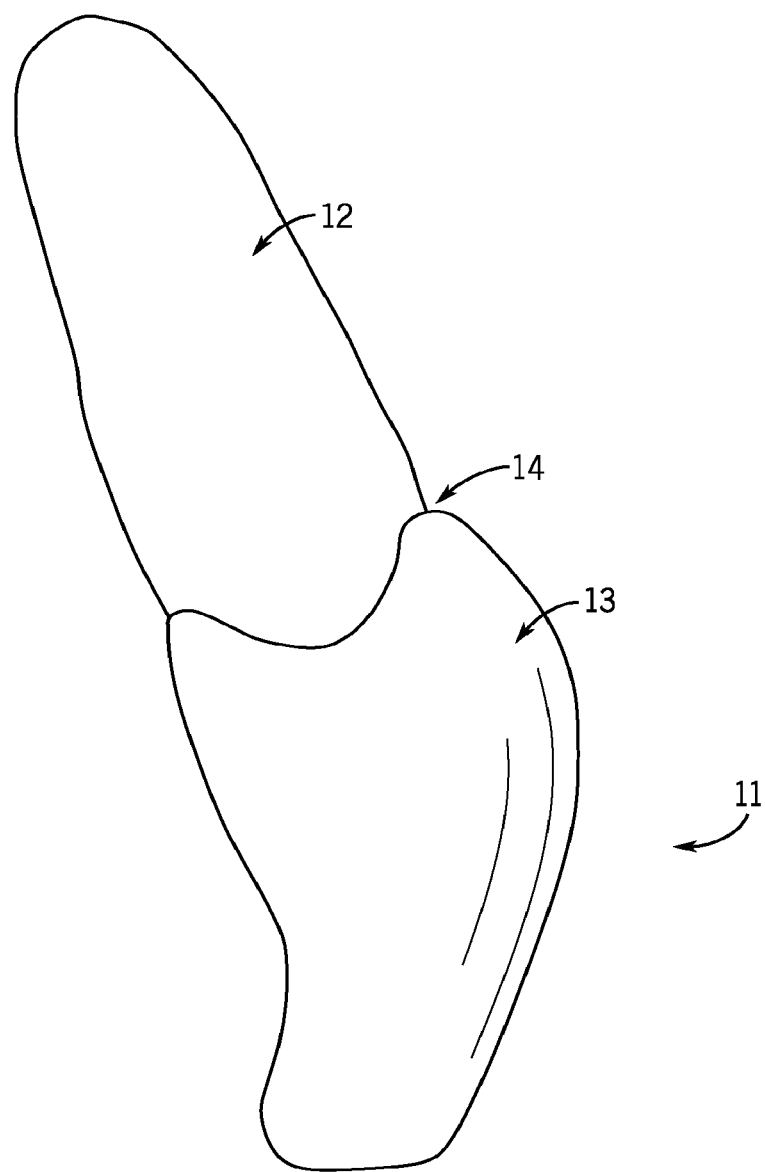
FIG. 5 is a side view of the human left central incisor.
Figure 6:
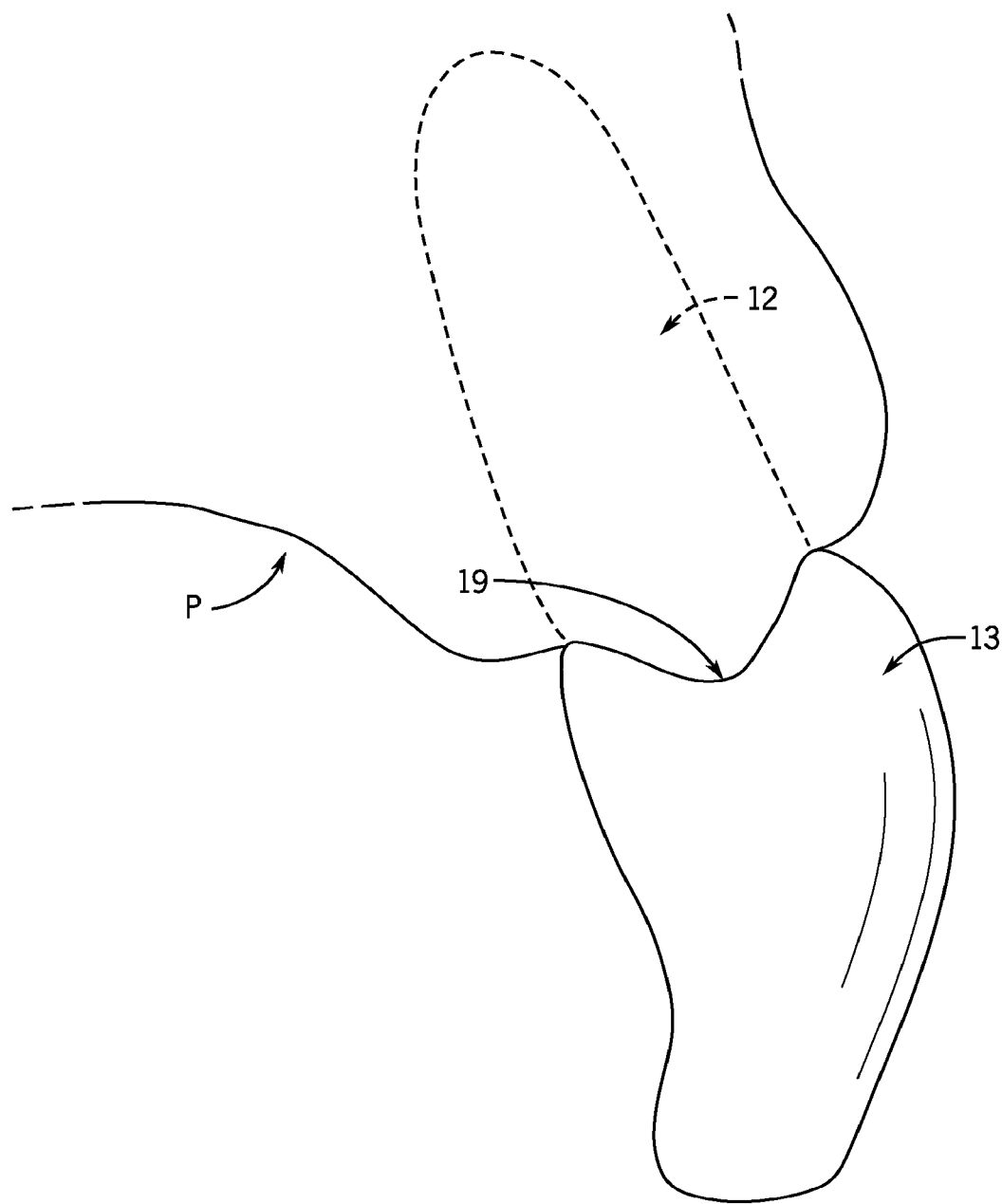
FIG. 6 is a side view of the human left central incisor showing the palate P and the gingival margin.
Figure 7:
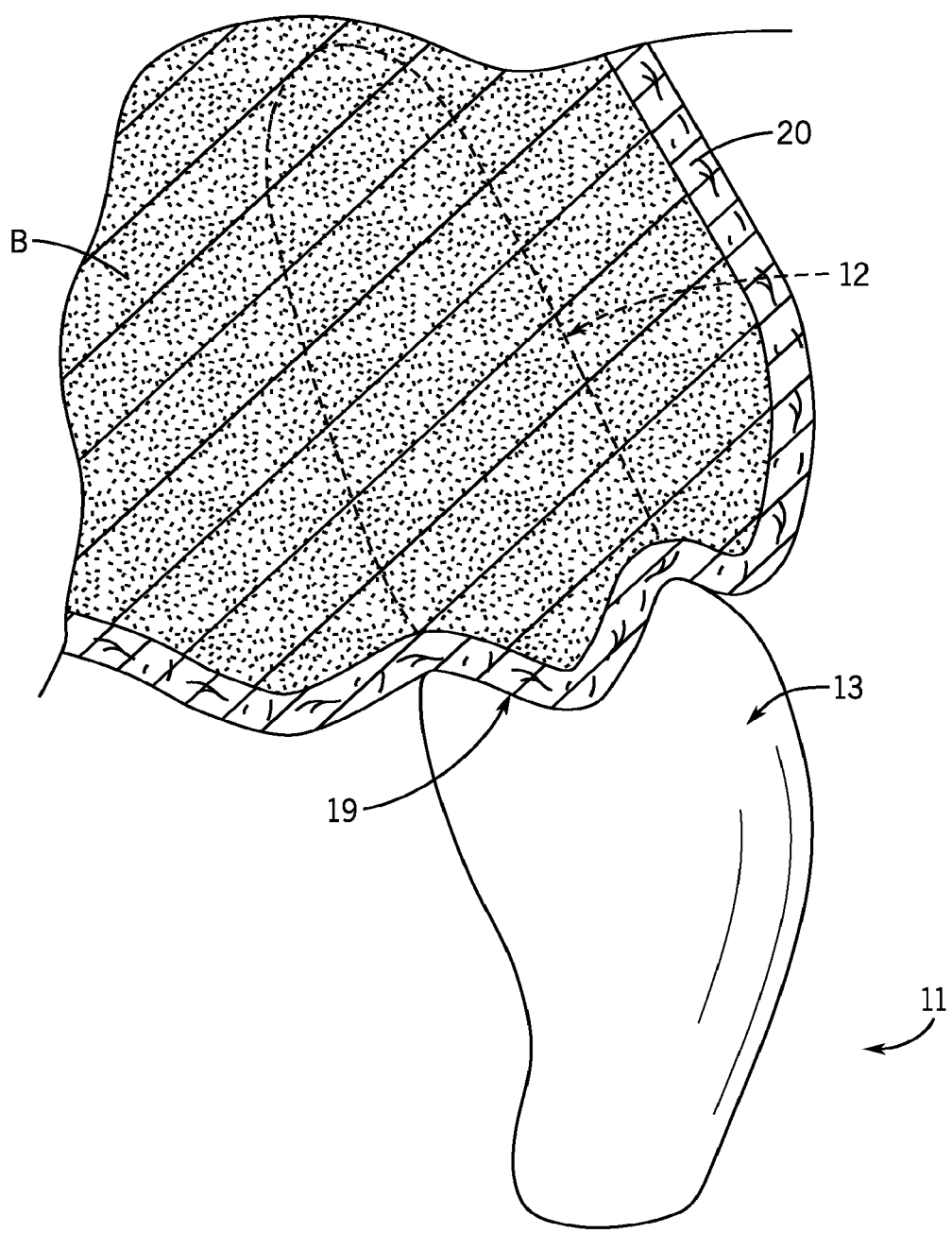
FIG. 7 is a side view of the human left central incisor showing the gingiva 20 and bone B.
Figure 8:
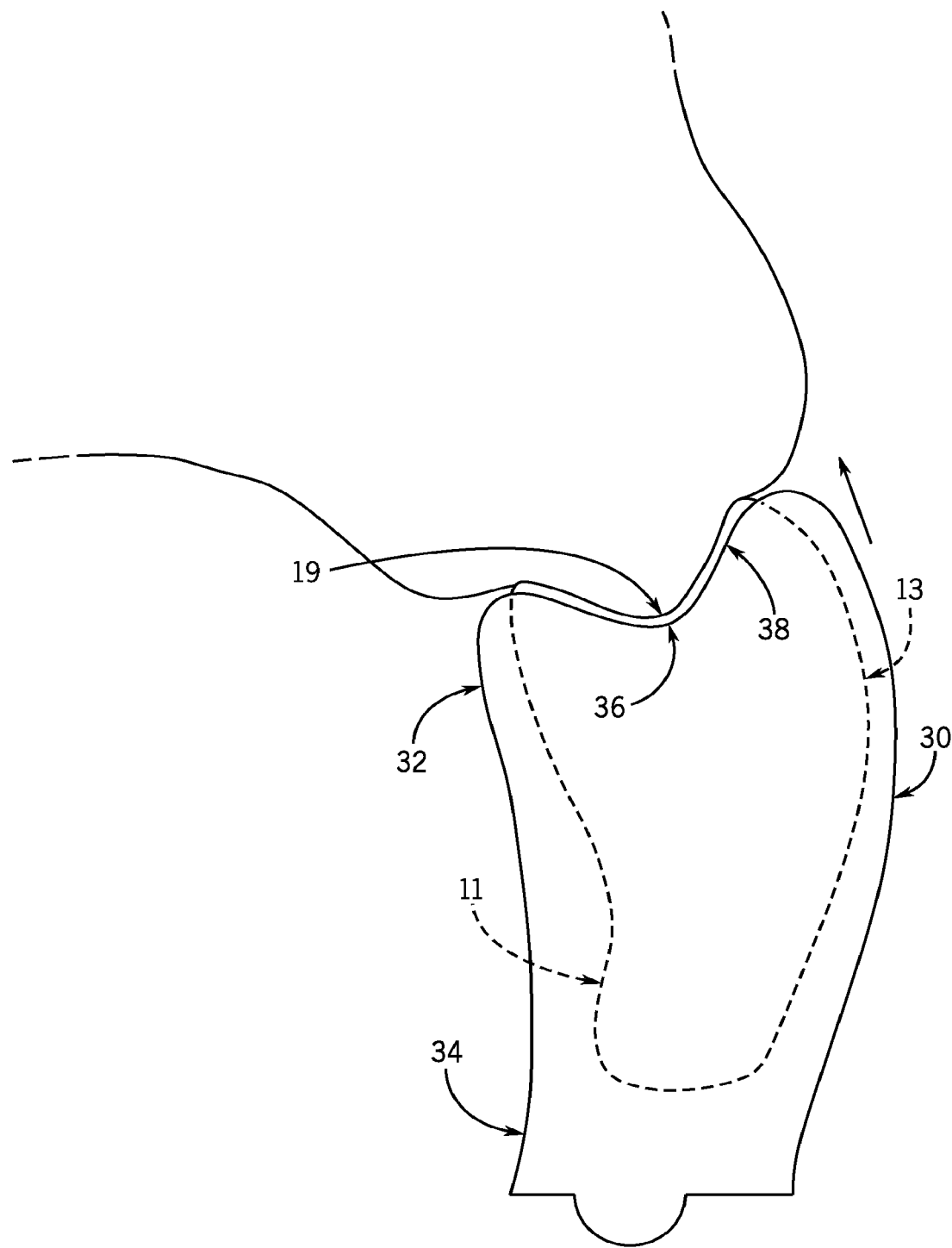
FIG. 8 shows a mesial view of a non-limiting example dental matrix according to the invention positioned on the human left central incisor.

Turning to FIG. 8, a mesial view of a non-limiting example dental matrix 30 according to the invention is shown. In FIG. 8, an upper incisor 11 having a clear sectional dental matrix 30 placed on the incisor 11 is shown. The dental matrix 30 can be formed from a translucent or transparent material such as a polymeric film. One non-limiting example material is the polyester film commercially available as Mylar™. However, metallic (stiff) materials, such as stainless steel, can be used for the matrix 30. Also, the matrix 30 may have variable thickness. Also, the matrix 30 may be opaque. The matrix 30 has a strip of material having a length from a first end to a second end sufficient to create a form for molding a restorative material to a surface of a tooth being restored. The length of the strip can surround 90 to 370 degrees of the tooth. The length of the pre-curved matrix 30 is approximately 13 millimeters and the height can range approximately from 10 millimeters to 13 millimeters.

The matrix 30 has a root end section 32 that is anatomic in shape. The root end section 32 terminates at a gingival edge 38. The actual anatomic shapes of the root end section 32 of the matrix 30 can be created from scans of natural teeth, molds of natural teeth, and/or molds of tooth models. Thus, by "anatomic", it is meant that the root end section 32 of the matrix 30 has an inner surface that conforms to the shape of the outer surface of a particular region of the natural tooth that contacts the root end section 32 of the matrix 30. In one non-limiting example form, the matrix 30 has an inner surface that conforms to the shape of the outer surface of a root end section of an incisor tooth. In another non-limiting example form, the matrix 30 has an inner surface that conforms to the shape of the outer surface of a root end section of a canine tooth.

In FIG. 8, the mesial side of the root end section 32 of the matrix 30 has a downward cut away 36 creating a gingival edge 38 that corresponds in shape to a downward projection of gingival papilla at the gingival margin 19 adjacent the tooth 11 and underlying periodontal and bony attachments of the tooth 11. The distal side of the root end section 32 of the matrix 30 can also have a downward cut away 36 creating a gingival edge 38 that corresponds in shape to a downward projection of gingival papilla at the gingival margin 19 adjacent the tooth 11 and underlying periodontal and bony attachments of the tooth 11. The gingival papilla may have a generally pyramidal shape or a col shape (i.e., a saddle shape between two peaks).

Alternatively, the matrix 30 can be used on lower teeth. In this case, the mesial side of the root end section 32 of the matrix 30 has an upward cut away creating a gingival edge 38 that corresponds in shape to an upward projection of gingival papilla at the gingival margin 19 adjacent the tooth 11 and underlying periodontal and bony attachments of the tooth 11. The distal side of the root end section 32 of the matrix 30 can also have an upward cut away creating a gingival edge 38 that corresponds in shape to an upward projection of gingival papilla at the gingival margin 19 adjacent the tooth 11 and underlying periodontal and bony attachments of the tooth 11.

The root end section 32 of the matrix 30 can be fully or partially anatomic. As a result, the matrix 30 can be used without interdental wedges or elastic separators or spacers. The anatomic shape allows hands-free and wedge-free use as the matrix 30 hugs the tooth 11. The root end section 32 can have a vertical dimension in the range of 0.5 to 2 millimeters. The sectional matrix 30 has a second section 34 that is integral with the root end section 32. In the non-limiting embodiment of FIG. 8, the second section 34 of the matrix 30 is not anatomically shaped to conform to the shape of the outer surface of the tooth 11.

Figure 9:
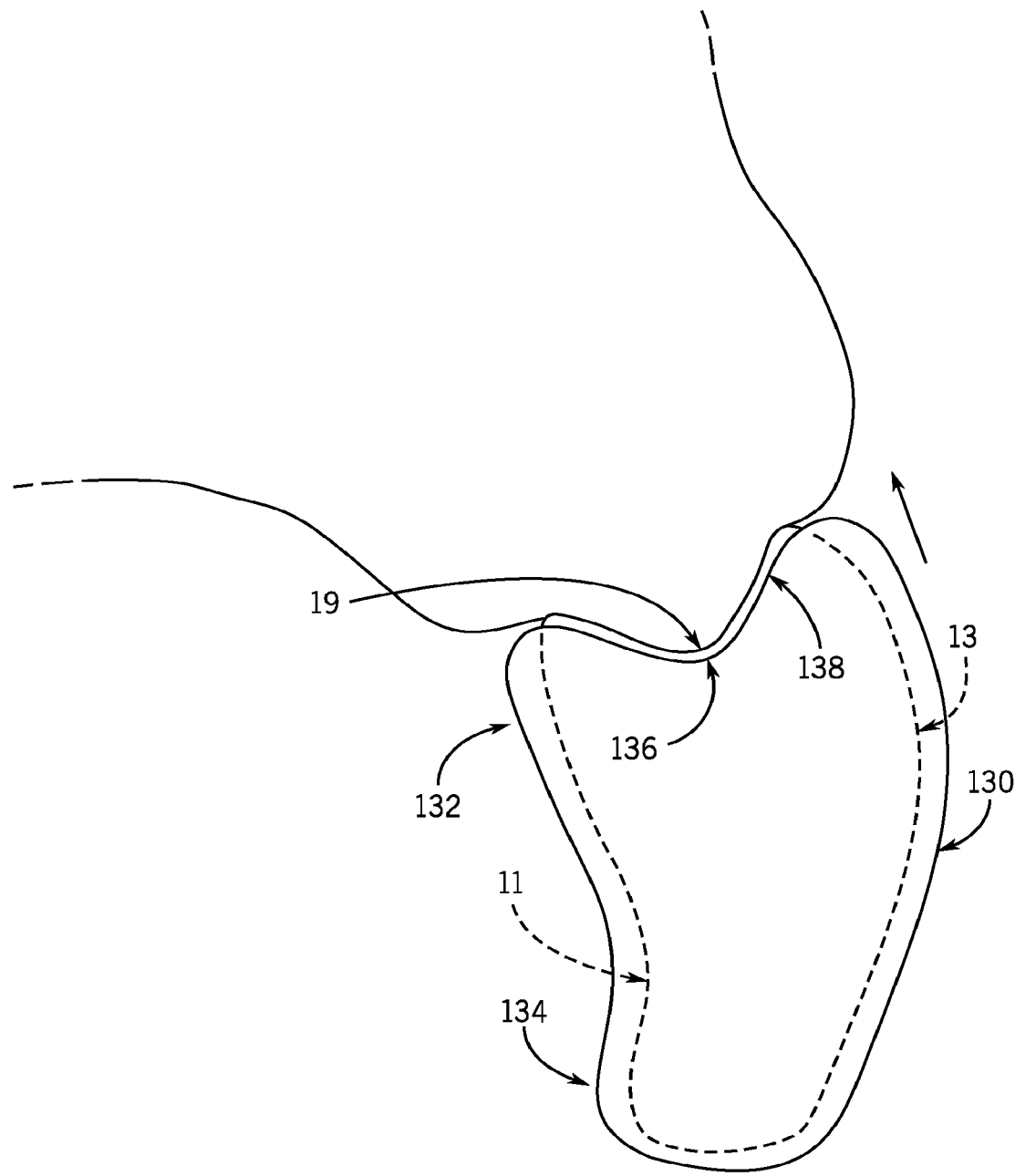
FIG. 9 shows a mesial view of another non-limiting example dental matrix according to the invention positioned on the human left central incisor.
Figure 10A:
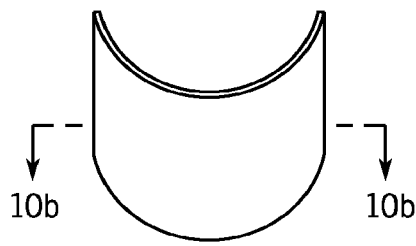
FIG. 10a is a side view of a prior sectional dental matrix.
Figure 10B:

Turning to FIG. 9, a mesial view of another non-limiting example dental matrix 130 according to the invention is shown. In FIG. 8, an upper incisor 11 having a clear sectional dental matrix 130 placed on the incisor 11 is shown. The dental matrix 130 can be formed from a translucent or transparent material such as a polymeric film. One non-limiting example material is the polyester film commercially available as Mylar™. However, metallic (stiff) materials, such as stainless steel, can be used for the matrix 130. Also, the matrix 130 may have variable thickness. Also, the matrix 130 may be opaque. The matrix 130 has a strip of material having a length from a first end to a second end sufficient to create a form for molding a restorative material to a surface of a tooth being restored. The length of the pre-curved matrix 130 is approximately 13 millimeters and the height can range approximately from 10 millimeters to 13 millimeters.

The matrix 130 has a root end section 132 that is anatomic in shape. The root end section 132 terminates at a gingival edge 138. The actual anatomic shapes of the root end section 132 of the matrix 130 can be created from scans of natural teeth, molds of natural teeth, and/or molds of tooth models. Thus, by "anatomic", it is meant that the root end section 132 of the matrix 130 has an inner surface that conforms to the shape of the outer surface of a particular region of the natural tooth that contacts the root end section 132 of the matrix 30.

In FIG. 9, the mesial side of the root end section 132 of the matrix 130 has an upward cut away 136 creating a gingival edge 138 that corresponds in shape to an upward projection of gingival papilla at the gingival margin 19 adjacent the tooth 11 and underlying periodontal and bony attachments of the tooth 11. The distal side of the root end section 132 of the matrix 130 can also have an upward cut away 136 creating a gingival edge 138 that corresponds in shape to an upward projection of gingival papilla at the gingival margin 19 adjacent the tooth 11 and underlying periodontal and bony attachments of the tooth 11.

Alternatively, the matrix 130 can be used on lower teeth. In this case, the mesial side of the root end section 132 of the matrix 130 has an upward cut away creating a gingival edge 138 that corresponds in shape to an upward projection of gingival papilla at the gingival margin 19 adjacent the tooth 11 and underlying periodontal and bony attachments of the tooth 11. The distal side of the root end section 132 of the matrix 130 can also have an upward cut away creating a gingival edge 138 that corresponds in shape to an upward projection of gingival papilla at the gingival margin 19 adjacent the tooth 11 and underlying periodontal and bony attachments of the tooth 11.

The root end section 132 of the matrix 130 can be fully or partially anatomic. As a result, the matrix 130 can be used without interdental wedges or elastic separators or spacers. The anatomic shape allows hands-free and wedge-free use as the matrix 130 hugs the tooth 11. The root end section 132 can have a vertical dimension in the range of 0.5 to 2 millimeters. The sectional matrix 130 has a second section 134 that is integral with the root end section 132. In the non-limiting embodiment of FIG. 9, the second section 134 of the matrix 130 is anatomically shaped to conform to the shape of the outer surface of the tooth 11. Thus, a fully anatomic matrix is also in accordance with the invention. By "anatomic", it is meant that the matrix has an inner surface that conforms to the shape of the outer surface of the region of the natural tooth being restored. In one non-limiting example form, the matrix 130 has an inner surface that conforms to the shape of the outer surface of a root end section of an incisor tooth. In another non-limiting example form, the matrix 130 has an inner surface that conforms to the shape of the outer surface of a root end section of a canine tooth.

The root end section 132 and the second section 134 of the matrix 130 can be tooth specific. By "tooth specific" it is meant that the root end section 132 and the second section 134 of the matrix 130 are configured to conform to the shape of the outer surface of the specific natural tooth being restored, such as (without limitation) a maxillary lateral incisor. The root end section 132 and the second section 134 of the matrix 130 can also be tooth type specific. By "tooth type specific", it is meant that the root end section 132 and the second section 134 of the matrix 30 are configured to conform to the shape of the outer surface of the specific type of natural tooth such as (without limitation) an incisor. The root end section 132 and the second section 134 of the matrix 130 can be tooth surface specific. By "tooth surface specific" it is meant that the root end section 132 and the second section 134 of the matrix 130 are configured to conform to the shape of the outer surface of the specific natural tooth surface such (without limitation) a lingual or buccal incisor surface.

A sectional matrix according to the invention can be anatomically shaped such that the matrix is hands free and self stabilizing (i.e., there is no requirement for a matrix stabilizer that conforms the matrix to the tooth). Ends of the matrix can be curved inwardly in a non-anatomic fashion or an anatomic fashion, and the spring-like nature of the memory of the shape can provide tension to retain the matrix once it snaps onto the tooth. No wedging device or retainer or clamp device is needed to stabilize the matrix. The matrix may include a feature for active hands-free wedge free retention of the matrix. The feature may selected from (a) adhesive, (b) static electricity charge, (c) light cure adhesive, (d) gingival harpoons, (e) mechanical prominences that lock under a contact or soft tissue, (f) a first configuration wherein the matrix wraps past 180 degrees curving in an anatomic fashion, (g) a second configuration wherein a radius of the entire matrix is smaller than an anatomic radius of the tooth creating tension to stabilize the matrix, and (h) any combinations thereof.

Figure 11A:
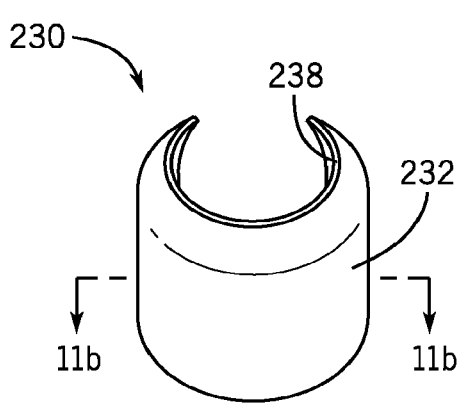
FIG. 11a is a side view of an example embodiment of a sectional hands free and self stabilizing posterior dental matrix according to the invention.
Figure 11B:
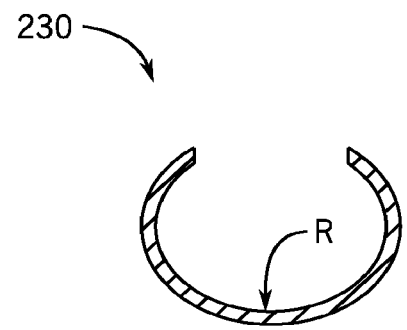

FIGS. 11a and 11b show an example embodiment of a sectional hands free and self stabilizing posterior dental matrix according to the invention. The dental matrix 230 can be formed from a translucent or transparent material such as a polymeric film. One non-limiting example material is the polyester film commercially available as Mylar™. However, other flexible materials, such as stainless steel, can be used for the matrix 230. Also, the matrix 230 may have variable thickness. Also, the matrix 230 may be opaque. The matrix 230 has a strip of material having a length from a first end to a second end sufficient to create a form for molding a restorative material to a surface of a tooth being restored.

In FIG. 11a, the root end section 232 of the matrix 230 has an inwardly curved shape creating an inwardly directed gingival edge 238 which is purposely curled in at the edge to create a mechanical snap fit on the tooth, and the shape memory of the Mylar™ polyester film will stabilize the matrix 230 during bonding and filling or injecting activities on the tooth. The inwardly curved shape of the root end section 232 may be non-anatomic or anatomic. The matrix 230 wraps past 180 degrees curving in an anatomic fashion. Before placing the matrix 230 on a tooth, a radius R (see FIG. 11b) of the entire matrix 230 is preferably smaller than an anatomic radius of the tooth creating tension to stabilize the matrix 230 on the tooth. In one non-limiting example form, the matrix 230 has an inner surface that conforms to the shape of the outer surface of a root end section of an incisor tooth. In another non-limiting example form, the matrix 230 has an inner surface that conforms to the shape of the outer surface of a root end section of a canine tooth.

Figure 12A:
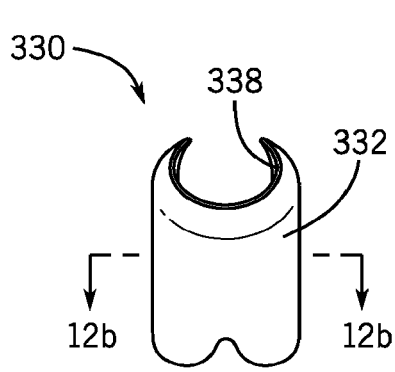
FIG. 12a is a side view of an example embodiment of a sectional anterior hands free and self stabilizing dental matrix according to the invention.
Figure 12B:
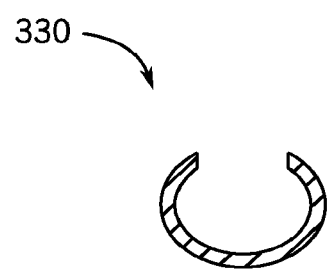
Figure 13:
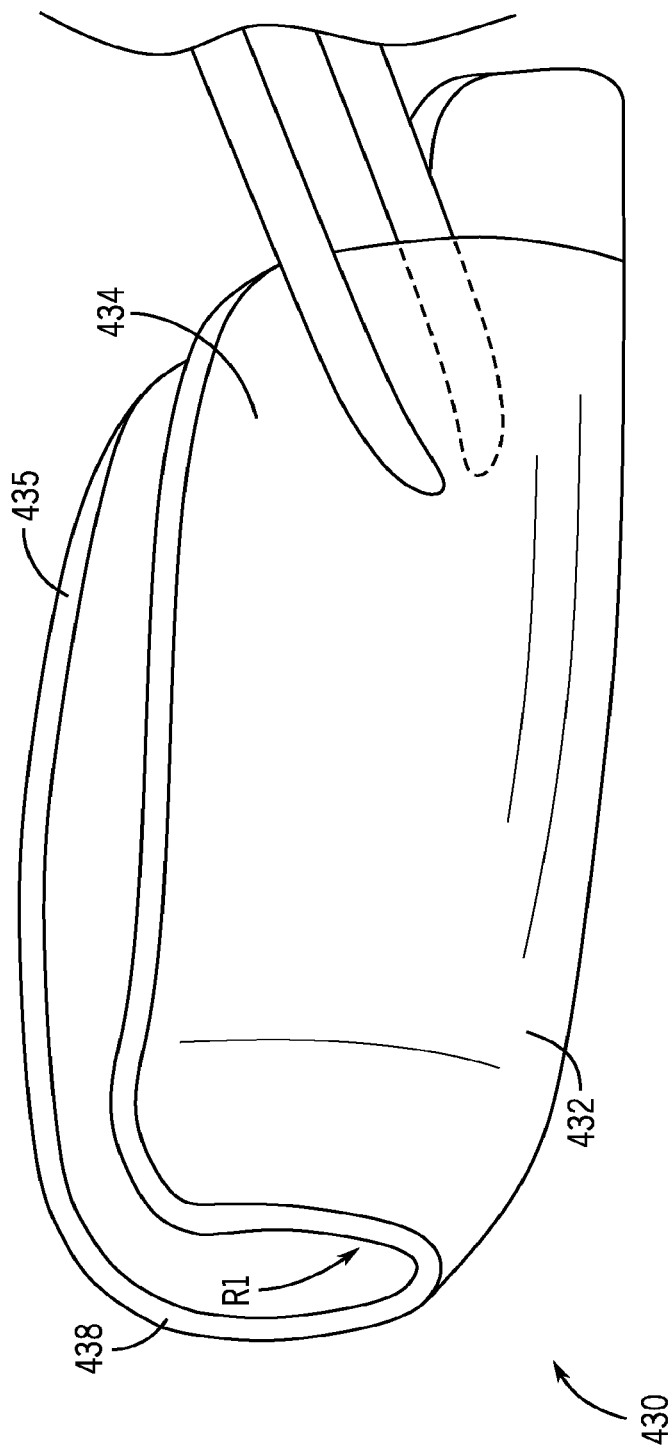
FIG. 13 is a distal side view of another example embodiment of a sectional hands free and self stabilizing anterior dental matrix according to the invention.
Figure 14:
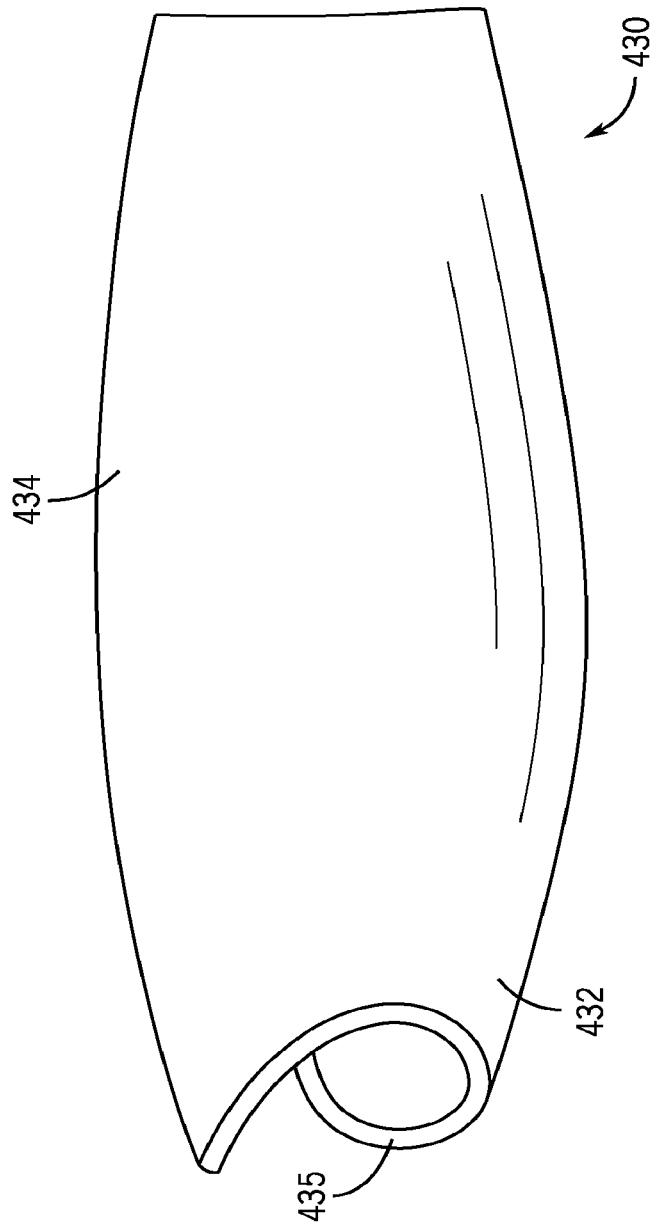
FIG. 14 is a front view of the anterior dental matrix of FIG. 13.

FIGS. 12a and 12b show an example embodiment of a sectional anterior hands free and self stabilizing dental matrix according to the invention. The dental matrix 330 can be formed from a translucent or transparent material such as a polymeric film. One non-limiting example material is the polyester film commercially available as Mylar™. However, other flexible materials, such as stainless steel, can be used for the matrix 330. Also, the matrix 330 may have variable thickness. Also, the matrix 330 may be opaque. The matrix 330 has a strip of material having a length from a first end to a second end sufficient to create a form for molding a restorative material to a surface of a tooth being restored.

In FIG. 12a, the root end section 332 of the matrix 330 has an inwardly curved shape creating an inwardly directed gingival edge 338 which is purposely curled in at the edge to create a mechanical snap fit on the tooth, and the shape memory of the Mylar™ polyester film will stabilize the matrix 330 during bonding and filling or injecting activities on the tooth, especially helpful on front teeth where there is no wedge or Tofflemire type device to winch it tight or wedge it to keep it from flopping around. The inwardly curved shape of the root end section 332 may be non-anatomic or anatomic. The matrix 330 wraps past 180 degrees curving in an anatomic fashion. Before placing the matrix 330 on a tooth, a radius (similar to R in FIG. 11b) of the entire matrix 330 is preferably smaller than an anatomic radius of the tooth creating tension to stabilize the matrix 330 on the tooth. In one non-limiting example form, the matrix 330 has an inner surface that conforms to the shape of the outer surface of a root end section of an incisor tooth. In another non-limiting example form, the matrix 330 has an inner surface that conforms to the shape of the outer surface of a root end section of a canine tooth.

FIGS. 13-18 show another example embodiment of a sectional hands-free and self stabilizing anterior dental matrix according to the invention. The dental matrix 430 can be formed from a translucent or transparent material such as a polymeric film. One non-limiting example material is the polyester film commercially available as Mylar™. However, other flexible materials, such as stainless steel, can be used for the matrix 430. Also, the matrix 430 may have variable thickness. Also, the matrix 430 may be opaque. The matrix 430 has a strip of material having a length from a first end 434 to a second end 435 sufficient to create a form for molding a restorative material to a surface of a tooth being restored.

The root end section 432 of the matrix 430 has an inwardly curved shape creating an inwardly directed gingival edge 438 which is purposely curled in at the edge to create a mechanical snap fit on the tooth, and the shape memory of the Mylar™ polyester film will stabilize the matrix 430 during bonding and filling or injecting activities on the tooth, especially helpful on front teeth where there is no wedge or Tofflemire type device to winch it tight or wedge it to keep it from flopping around. The inwardly curved shape of the root end section 432 may be non-anatomic or anatomic. The matrix 430 wraps past 180 degrees curving in an anatomic fashion. Before placing the matrix 430 on a tooth, a radius R1 (see FIG. 13) of the entire matrix 430 is preferably smaller than an anatomic radius of the tooth creating tension to stabilize the matrix 430 on the tooth. The gingival edge 438 is inwardly directed toward a centerpoint of radius R1. In one non-limiting example form, the matrix 430 has an inner surface that conforms to the shape of the outer surface of a root end section of an incisor tooth. In another non-limiting example form, the matrix 430 has an inner surface that conforms to the shape of the outer surface of a root end section of a canine tooth.

Figure 15:
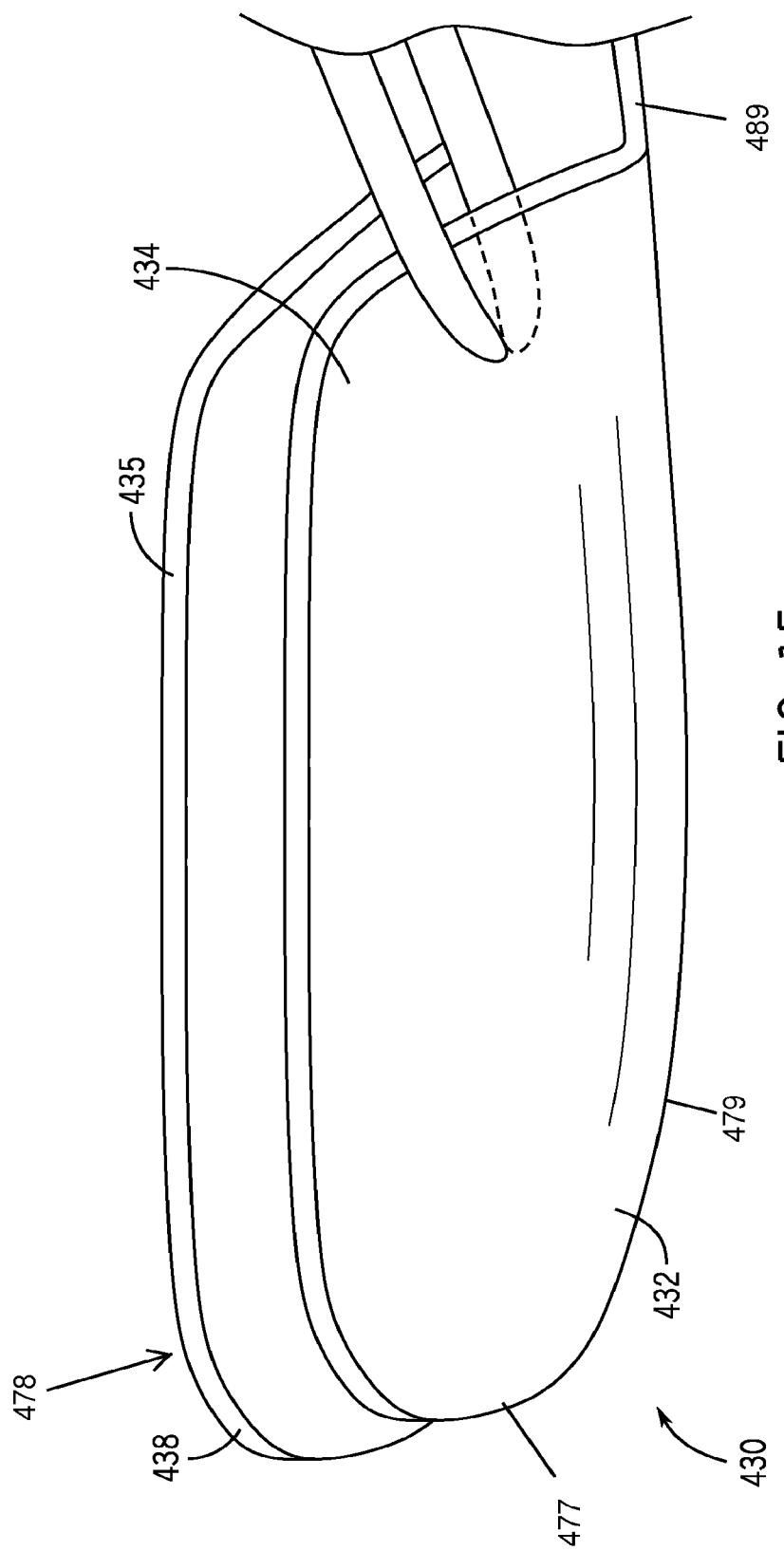
FIG. 15 is another side view of the anterior dental matrix of FIG. 13.
Figure 16:
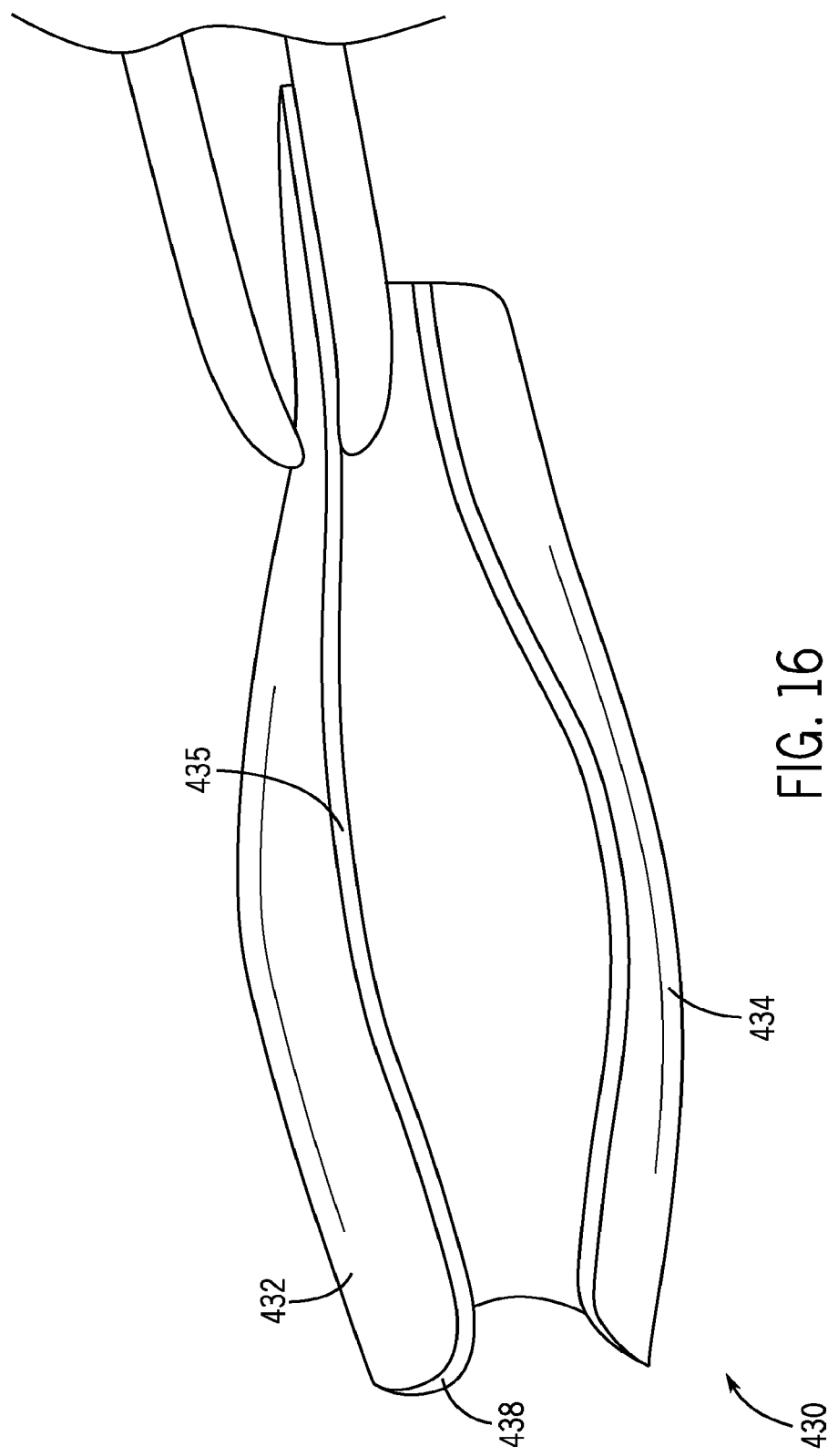
FIG. 16 is a rear view of the anterior dental matrix of FIG. 13.

As can be seen in FIG. 15, at the facial side 477 of the root end section 432 of the matrix 430, the gingival edge 438 is concave to correspond in shape to the gingival margin adjacent the tooth and underlying periodontal and bony attachments of the tooth. Also, at the lingual side 478 of the root end section 432 of the matrix 430, the gingival edge 438 is concave to correspond in shape to gingival margin adjacent the tooth and underlying periodontal and bony attachments of the tooth. The facial side 477 of the root end section 432 of the matrix 430 is free of any facially projecting element that may hinder the process of placing the restorative material on the tooth. Likewise, the lingual side 478 of the root end section 432 of the matrix 430 is free of any lingually projecting element that may hinder the process of placing the restorative material on the tooth. Likewise, the mesial (or distal) side 479 of the root end section 432 of the matrix 430 is free of any mesially (or distally) projecting element that may hinder the process of placing the restorative material on the tooth. A grasping tab 489 extends longitudinally from the mesial (or distal) side of the matrix 430.

Figure 23:
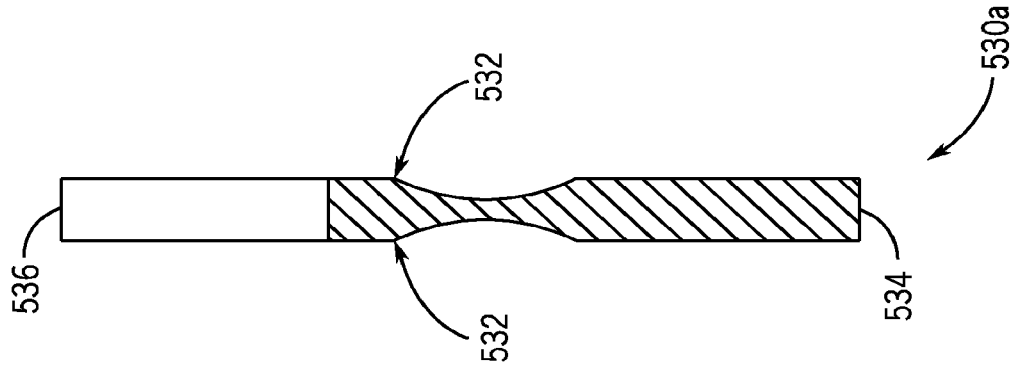
FIG. 23 is a cross-sectional view, similar to FIG. 22, of another sectional dental matrix according to the invention.
Figure 22:
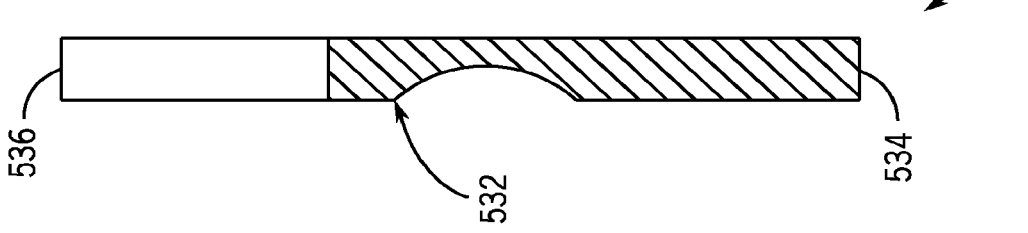
FIG. 22 is a cross-sectional view of the sectional dental matrix of FIG. 21 taken along line 22-22 of FIG. 21.
Figure 21:
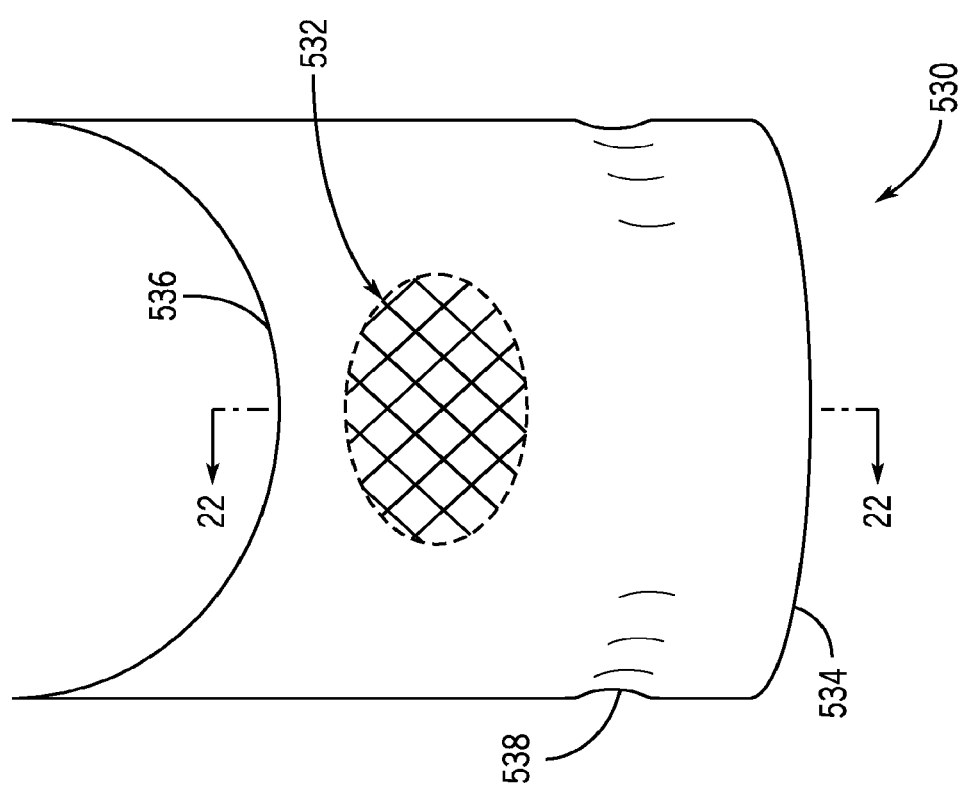
FIG. 21 is a side view of the sectional hands free and self stabilizing anterior dental matrix of FIG. 19.
Figure 28:
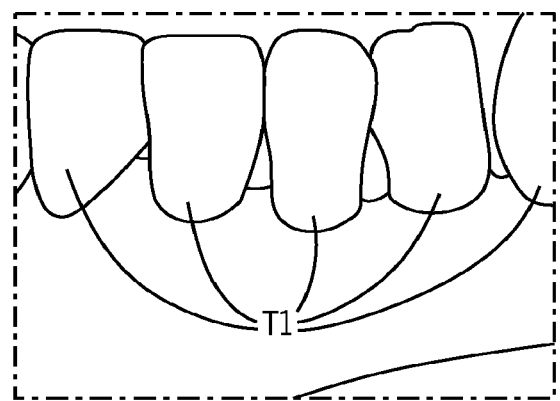
FIG. 28 shows a front view of four anterior teeth before grinding down for an indirect restoration.
Figure 29:
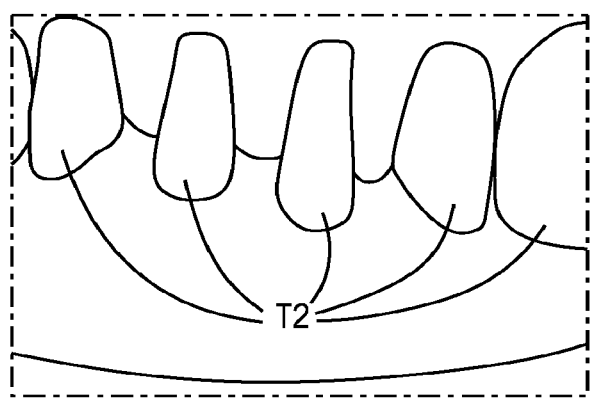
FIG. 29 shows a front view of the anterior teeth of FIG. 28 after grinding down for an indirect restoration.
Figure 30:
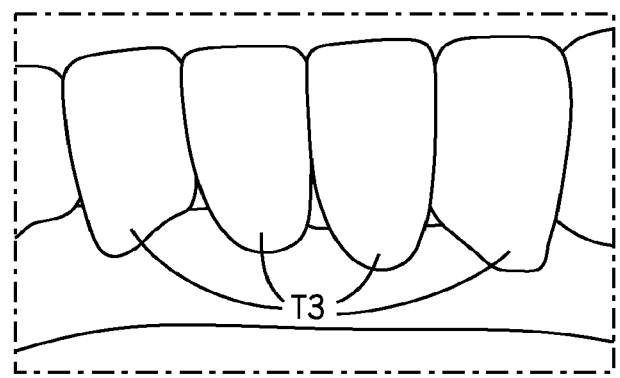
FIG. 30 shows a front view of the anterior teeth of FIG. 29 after the indirect restoration.
Figure 31:
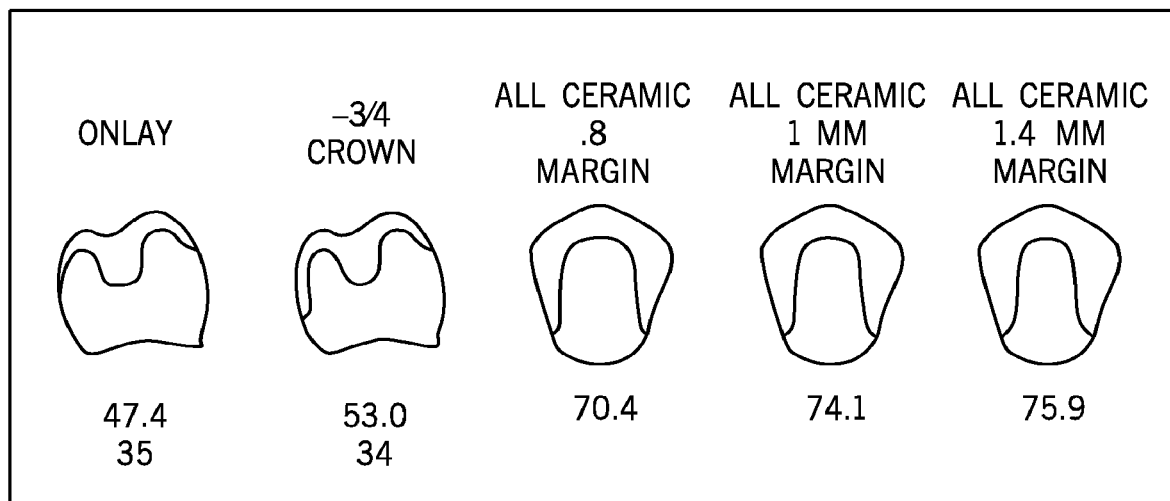
FIG. 31 shows the volumetric reduction of a tooth for various onlay or crown preparations.

Variable thickness matrices are also provided by the invention. One version of a variable thickness matrix is indicated at 530 in FIGS. 19 and 21. This matrix 530 has a gingival edge 534 and an occlusal edge 536 and a root-crown junction region 538. This matrix 530 has an ovoid area 532 that can be between 1 millimeter by 2 millimeters and up to 4 millimeters by 6 millimeters in size. The average thickness of the matrix 530 is between 10 microns and 75 microns. The thinner ovoid area 532 of the matrix 530 is between 1% thinner up to 99% thinner than the above mentioned thicknesses of the matrix 530. The thinning can be abrupt (e.g., a stepped transition in thickness) as in the cross section of FIG. 22. In an alternative matrix 530a of FIG. 23, the matrix 530a can be thinned from both sides. Preferably, the area of thinned material is only at the contact area between teeth. In one non-limiting example form, the matrix 530 has an inner surface that conforms to the shape of the outer surface of a root end section of an incisor tooth. In another non-limiting example form, the matrix 530 has an inner surface that conforms to the shape of the outer surface of a root end section of a canine tooth.

Another version of a variable thickness matrix is indicated at 630 in FIGS. 20 and 24 and 25. Matrix 630 has a 1-4 millimeter band 632 of thinned material from left to right across the entire width of the matrix 630 in the occlusal third of the matrix. This matrix 630 has a gingival edge 634 and an occlusal edge 636 and a root-crown junction region 638. The average thicknesses of the matrix 630 can vary between 10 microns and 75 microns. The thin band 632 of the matrix 630 would be between 1% thinner up to 99% thinner than the above mentioned thicknesses of the matrix 630. The thinning can be abrupt as in the cross section of FIG. 25. The matrix 630 can be thinned from one side as in the cross section of FIG. 25. Another matrix 630a is thinned from both sides as in the cross section of FIG. 26. In another matrix 630b, the change in thickness of the matrix 630b would transition over the entire area of the matrix 630b in both occlusal-gingival directions and buccal-lingual directions as in the cross section of FIG. 27, or any combination thereof. In one non-limiting example form, the matrix 630 has an inner surface that conforms to the shape of the outer surface of a root end section of an incisor tooth. In another non-limiting example form, the matrix 630 has an inner surface that conforms to the shape of the outer surface of a root end section of a canine tooth.

The thinned areas of the dental matrices 530, 530a, 630, 630a, and 630b can be achieved using different manufacturing methods. For example, a stainless steel strip can be thinned from inside and out using indenting (such as by hammering) from both sides. First one makes a strip, and then indents the strip as a secondary operation. The stainless steel strip can be thinned from inside and out using burnishing. Hammered steel may be more malleable such that a pre-burnished/hammered contact area that is more flexible than normal steel or heat-treated for stiffness steel.

The dental matrices 530, 530a, 630, 630a, and 630b can be for anterior and/or posterior teeth. The matrices 530, 530a, 630, 630a, and 630b can be sectional, or 360 degree (Tofflemire type) matrices. The dental matrices 530, 530a, 630, 630a, and 630b can be formed from a translucent or transparent material such as a polymeric film. One non-limiting example material is the polyester film commercially available as Mylar™. However, metallic (stiff) materials, such as stainless steel, can be used for the dental matrices 530, 530a, 630, 630a, and 630b. Also, the dental matrices 530, 530a, 630, 630a, and 630b may be opaque.

In a two step process, a dentist can forgo the use of a matrix stabilizer for the first step when the cavity is deep and/or on the root surface and first apply composite to create an undercut that will allow the subsequent use of a matrix stabilizer with more ease in a single step injection molding technique to finish the filling.

While certain methods and matrices of the present disclosure have been described as providing methods and matrices for the restoration of a decayed portion of an anterior tooth or re-restoration of a previously filled anterior tooth, the invention is not limited to this use. The scalloped matrix described herein is useful for other applications. For example, the matrix can used for: (1) diastema closure (i.e., the tooth may not be decayed, the use of the matrix is strictly for esthetic veneering of the tooth to close a space); and (2) a veneering of the tooth when there is no need to close a space in the case of worn, dark, misaligned or other aesthetic problems that the patient desires to be covered over. Also, different sized matrices can be provided in a kit.

Figure 32:
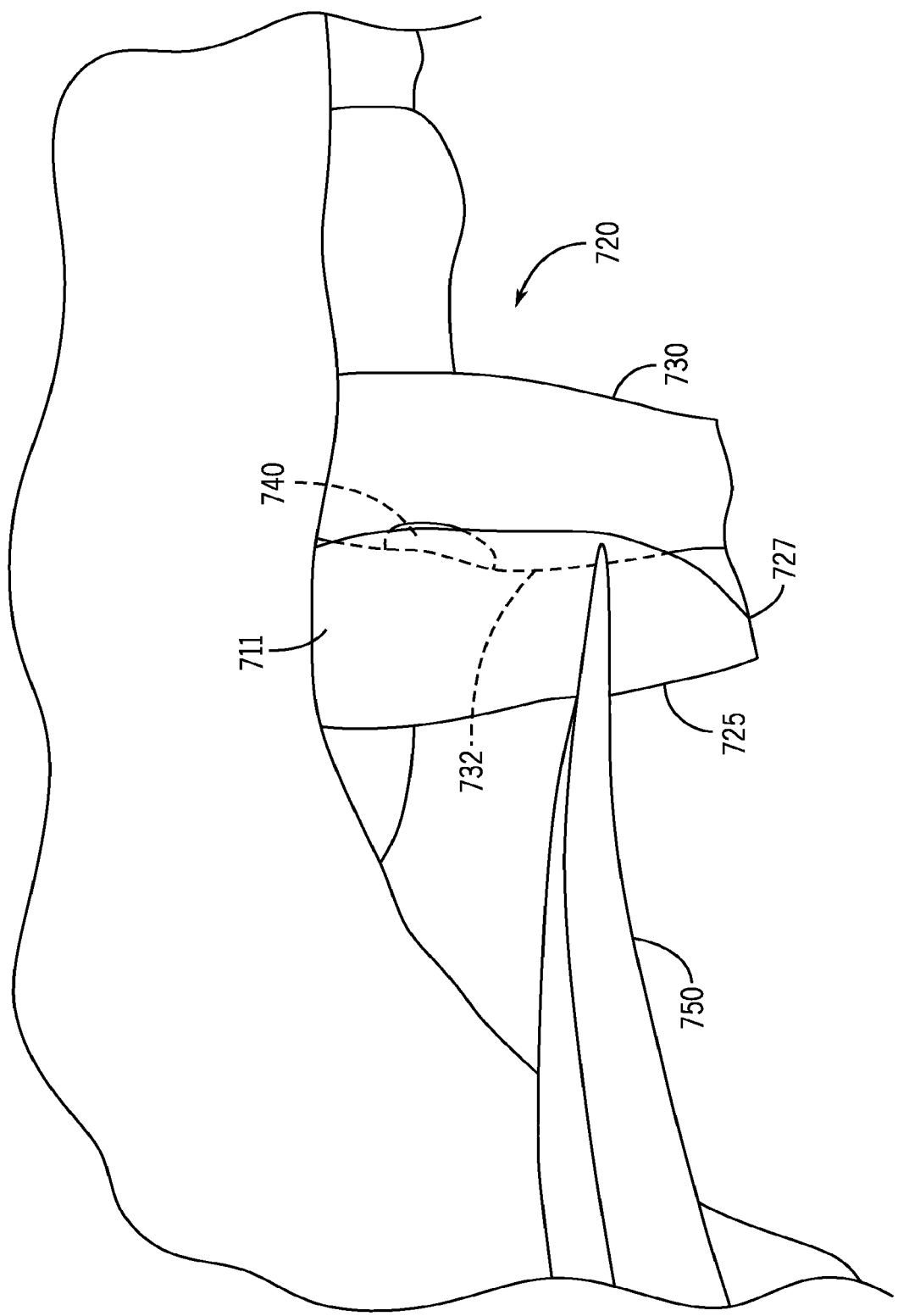
FIG. 32 shows a front view of a dental matrix system of the invention including a first sectional dental matrix and a second sectional dental matrix.

Turning to FIG. 32, a front view of a non-limiting example dental matrix system 720 according to the invention is shown. In FIG. 32, an upper incisor 711 having dental matrix system 720 including a first clear sectional dental matrix 725 and a second separate clear sectional dental matrix 730 placed on the incisor 711 is shown. The dental matrices 725 and 730 can be formed from a translucent or transparent material such as a polymeric film. One non-limiting example material is the polyester film commercially available as Mylar™. The dental matrices 725 and 730 may have variable thickness such as in any of dental matrices 530, 530a, 630, 630a, and 630b. Each of the dental matrices 725 and 730 has a strip of material having a length from a first end to a second end sufficient to create a form for molding a restorative material to a surface of a tooth being restored. The length of the strip of each of the dental matrices 725 and 730 can surround 180 to 250 degrees of the tooth. In one non-limiting version, the length of the pre-curved dental matrices 725 and 730 is approximately 13 millimeters and the height can range approximately from 10 millimeters to 13 millimeters.

Each of the dental matrices 725 and 730 has a root end section (similar to root end section 32 in FIG. 8) that is anatomic in shape. The root end section of each of the dental matrices 725 and 730 terminates at a gingival edge. The actual anatomic shapes of the root end sections of each of the dental matrices 725 and 730 can be created from scans of natural teeth, molds of natural teeth, and/or molds of tooth models. Thus, by "anatomic", it is meant that the root end section of each of the dental matrices 725 and 730 has an inner surface that conforms to the shape of the outer surface of a particular region of the natural tooth that contacts the root end section of each of the dental matrices 725 and 730.

The side of the root end section of the dental matrix 725 has a downward cut away (similar to the downward cut away 36 in FIG. 8) creating a gingival edge that corresponds in shape to a downward projection of gingival papilla at the gingival margin adjacent the tooth and underlying periodontal and bony attachments of the tooth. The side of the root end section of the dental matrix 730 can also have a downward cut away creating a gingival edge (similar to gingival edge 38 in FIG. 8) that corresponds in shape to a downward projection of gingival papilla at the gingival margin adjacent the tooth and underlying periodontal and bony attachments of the tooth.

Alternatively, each of the dental matrices 725 and 730 can be used on lower teeth. In this case, the sides of the root end section of each of the dental matrices 725 and 730 has an upward cut away creating a gingival edge that corresponds in shape to an upward projection of gingival papilla at the gingival margin adjacent the tooth and underlying periodontal and bony attachments of the tooth.

The root end section of each of the dental matrices 725 and 730 can be fully or partially anatomic. As a result, each of the dental matrices 725 and 730 can be placed on the tooth without interdental wedges or elastic separators or spacers. The anatomic shape allows hands-free and wedge-free use as each of the dental matrices 725 and 730 hugs the tooth.

The dental matrix 725 has a vertical edge 727, and the dental matrix 730 has a vertical edge 732. The section of the dental matrix 725 adjacent the vertical edge 727 overlaps a portion of the section of the dental matrix 730 adjacent the vertical edge 732. A hole 740 is created that allows excess dental restorative material to flow away from the tooth when dental restorative material is injected between the dental matrices 725 and 730 and the tooth 711.

The two sectional matrices 725 and 730 that each cover 180 to 250 degrees of the tooth 711 are placed on both sides of the tooth (mesial and distal or buccal and lingual) using a pliers as shown in FIG. 32 and together allow a full crown to be made directly with injection of composite. A one piece matrix ring cannot physically be used to form the crown unless the tooth is first ground down to a peg. The contact point of the neighboring teeth can be bypassed by lightly sanding the touch points, open to say 20 or 30 microns gap. Once inserted, a matrix at 50 microns will slide easily and push the teeth apart slightly. A second alternative is to temporarily tease the teeth apart with a dental instrument to allow passage of the matrix through the contact points.

Turning to FIGS. 33-37, a front view of a non-limiting example dental matrix system 820 according to the invention is shown. In FIGS. 33-37, an upper incisor 811 having dental matrix system 820 including a first clear sectional dental matrix 825 and a second clear sectional dental matrix 830 placed on the incisor 811 is shown. The dental matrices 825 and 830 can be formed from a translucent or transparent material such as a polymeric film. One non-limiting example material is the polyester film commercially available as Mylar™. The dental matrices 825 and 830 may have variable thickness such as in any of dental matrices 530, 530a, 630, 630a, and 630b. Each of the dental matrices 825 and 830 has a strip of material having a length from a first end to a second end sufficient to create a form for molding a restorative material to a surface of a tooth being restored. The length of the strip can surround 180 to 250 degrees of the tooth. In one non-limiting version, the length of the pre-curved dental matrices 825 and 830 is approximately 13 millimeters and the height can range approximately from 10 millimeters to 13 millimeters.

Each of the dental matrices 825 and 830 has a root end section (similar to root end section 32 in FIG. 8) that is anatomic in shape. The root end section of each of the dental matrices 825 and 830 terminates at a gingival edge. The actual anatomic shapes of the root end sections of each of the dental matrices 825 and 830 can be created from scans of natural teeth, molds of natural teeth, and/or molds of tooth models. Thus, by "anatomic", it is meant that the root end section of each of the dental matrices 825 and 830 has an inner surface that conforms to the shape of the outer surface of a particular region of the natural tooth that contacts the root end section of each of the dental matrices 825 and 830.

The side of the root end section of each of the dental matrix 825 has a downward cut away (similar to the downward cut away 36 in FIG. 8) creating a gingival edge that corresponds in shape to a downward projection of gingival papilla at the gingival margin adjacent the tooth and underlying periodontal and bony attachments of the tooth. The side of the root end section of the dental matrix 830 can also have a downward cut away creating a gingival edge (similar to gingival edge 38 in FIG. 8) that corresponds in shape to a downward projection of gingival papilla at the gingival margin adjacent the tooth and underlying periodontal and bony attachments of the tooth.

Alternatively, each of the dental matrices 825 and 830 can be used on lower teeth. In this case, the sides of the root end section of each of the dental matrices 825 and 830 has an upward cut away creating a gingival edge that corresponds in shape to an upward projection of gingival papilla at the gingival margin adjacent the tooth and underlying periodontal and bony attachments of the tooth.

The root end section of each of the dental matrices 825 and 830 can be fully or partially anatomic. As a result, each of the dental matrices 825 and 830 can be used without interdental wedges or elastic separators or spacers. The anatomic shape allows hands-free and wedge-free use as each of the dental matrices 825 and 830 hugs the tooth.

The dental matrix 825 has a vertical edge 827, and the dental matrix 830 has a vertical edge 832. The section of the dental matrix 825 adjacent the vertical edge 827 overlaps a portion 837 (see FIG. 34) of the section of the dental matrix 830 adjacent the vertical edge 832. An aperture 840 is created below the incisal edge 844 of the tooth 811 that allows dental restorative material 860 (see FIG. 37) to flow away from the tooth 811 when dental restorative material is injected between the dental matrices 825 and 830 and the tooth 811 at the incisal edge of the tooth 811. The aperture 840 exposes the tooth from gingival margin to a point P (see FIG. 34) on a facial surface of the tooth when the matrix 825 and the matrix 830 are placed on the tooth 811.

The two sectional matrices 825 and 830 that each cover 180 to 250 degrees of the tooth 811 are placed on both sides of the tooth (mesial and distal or buccal and lingual) using a pliers (as shown in FIG. 32) and together allow a full crown to be made directly with injection of composite. A one piece matrix ring cannot physically be used to form the crown unless the tooth is first ground down to a peg. The contact point of the neighboring teeth can be bypassed by lightly sanding the touch points, open to say 20 or 30 microns gap. Once inserted, a matrix at 50 microns will slide easily and push the teeth apart slightly. A second alternative is to temporarily tease the teeth apart with a dental instrument to allow passage of the matrix through the contact points.

Figure 35:
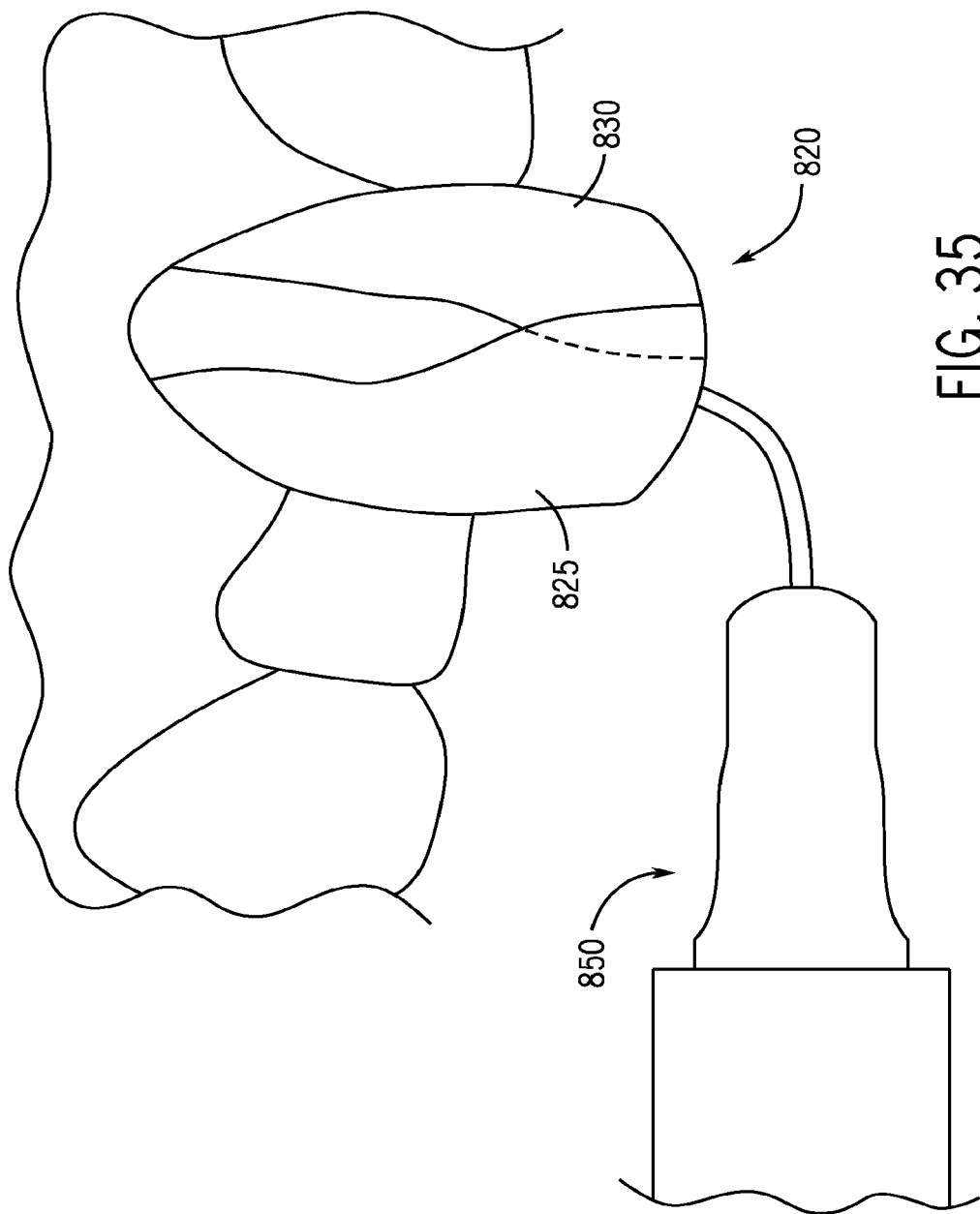
FIG. 35 shows a front view of an etching step in a method using the dental matrix system of FIG. 33.
Figure 36:
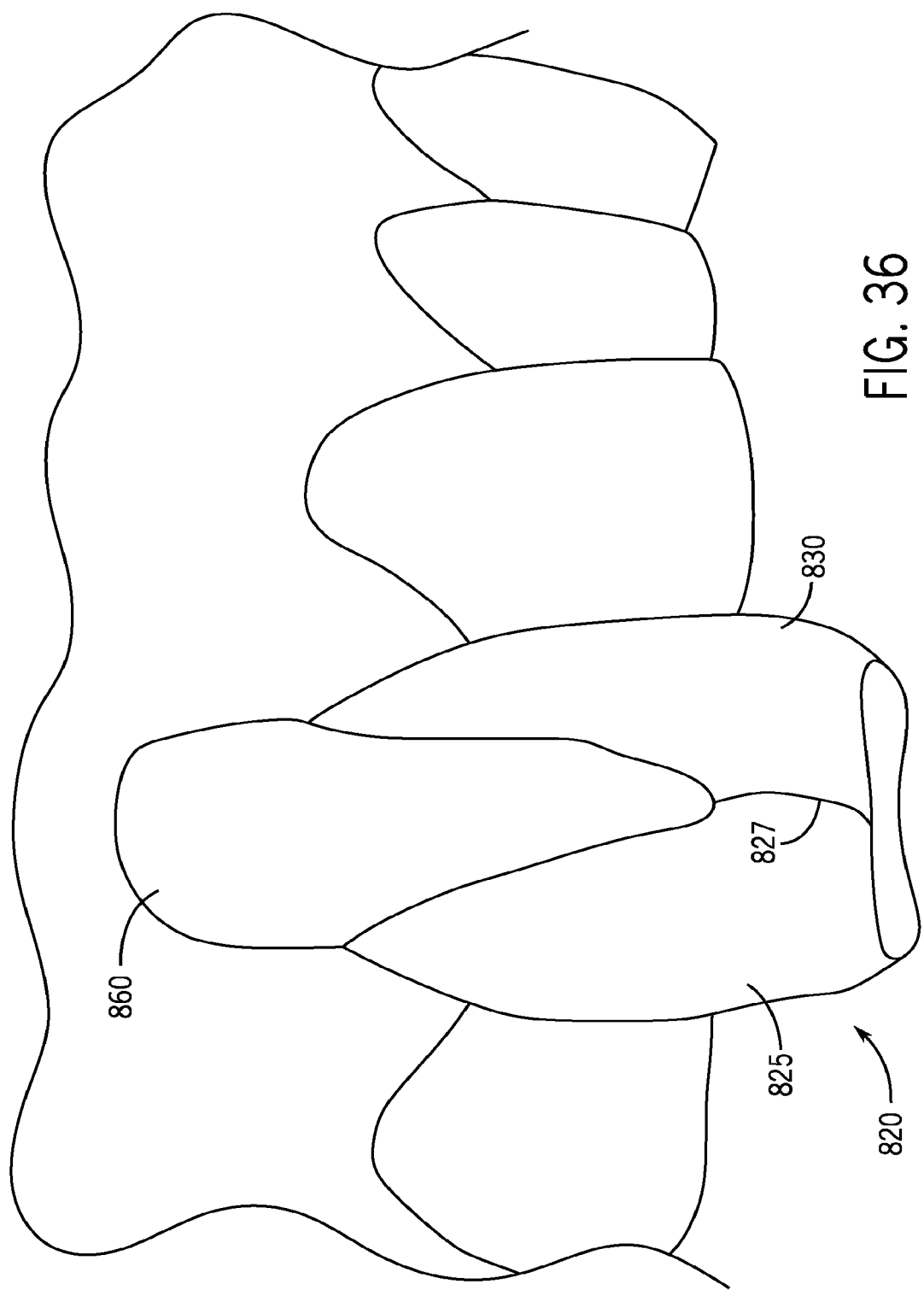
FIG. 36 shows a front view of the dental matrix system of FIG. 33 with excess dental restorative material having flowed through an aperture in the dental matrix system.
Figure 37:
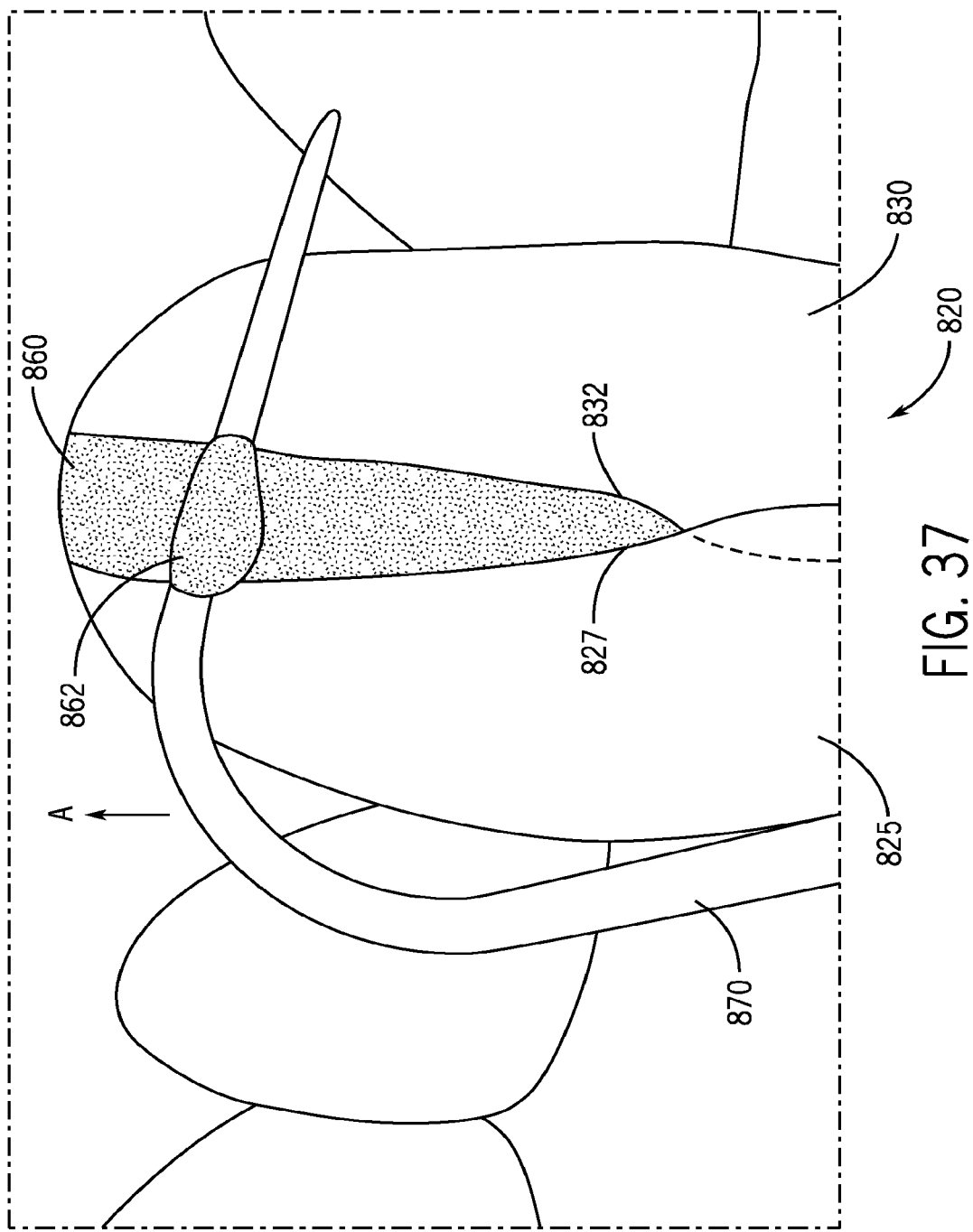
FIG. 37 shows a front view of an excess dental restorative material removal step in a method using the dental matrix system of FIG. 33.

It is customary in the art of reconstructing the aging, worn or heavily filled tooth to leave the tooth thicker than before beginning the procedure. In FIGS. 33-37, paired matrices 825, 830 are used to lengthen and thicken severely worn teeth without grinding the teeth at all. In the procedure, a dental practitioner prepares the tooth surfaces by first removing the biofilm and contamination off of the teeth with a mild abrasive water/abrasive spray. Then, the teeth are ready for modern adhesion and overmolding of the teeth. The teeth are etched (see FIG. 35 showing etchant being expressed from a syringe 850), then rinsed, then dried, and then adhesive is placed (all of these can be done with the dual matrices 825, 830 in position). Then, flowable composite is placed, and then heavier paste composite is placed driving out some or most of the excess flowable composite through the aperture 840. The excess dental restorative material 862 is removed using a tool 870 (see FIG. 37) and the restoration is cured (photo polymerized).

Figure 33:
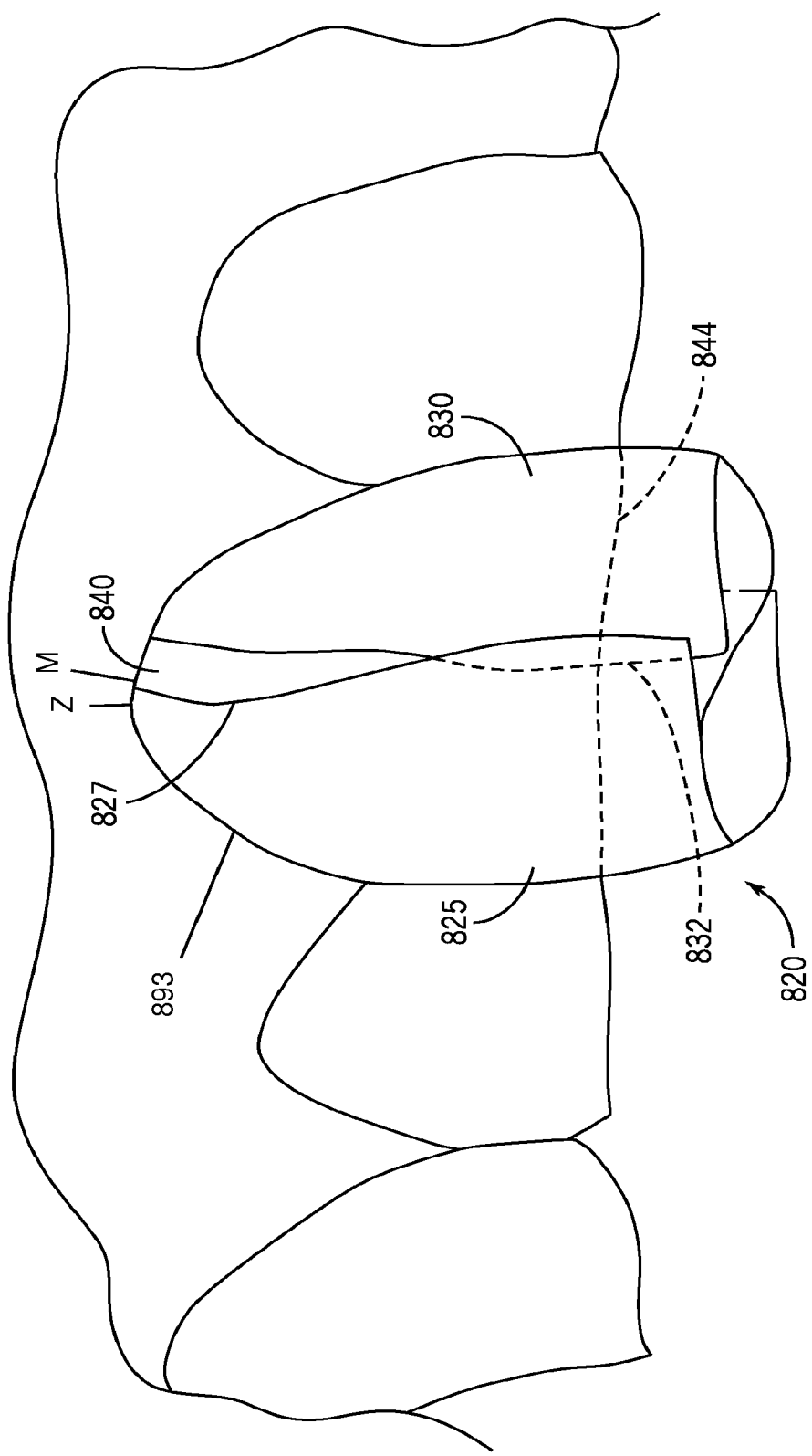
FIG. 33 shows a front view of another dental matrix system of the invention including a first sectional dental matrix and a second sectional dental matrix.
Figure 34:
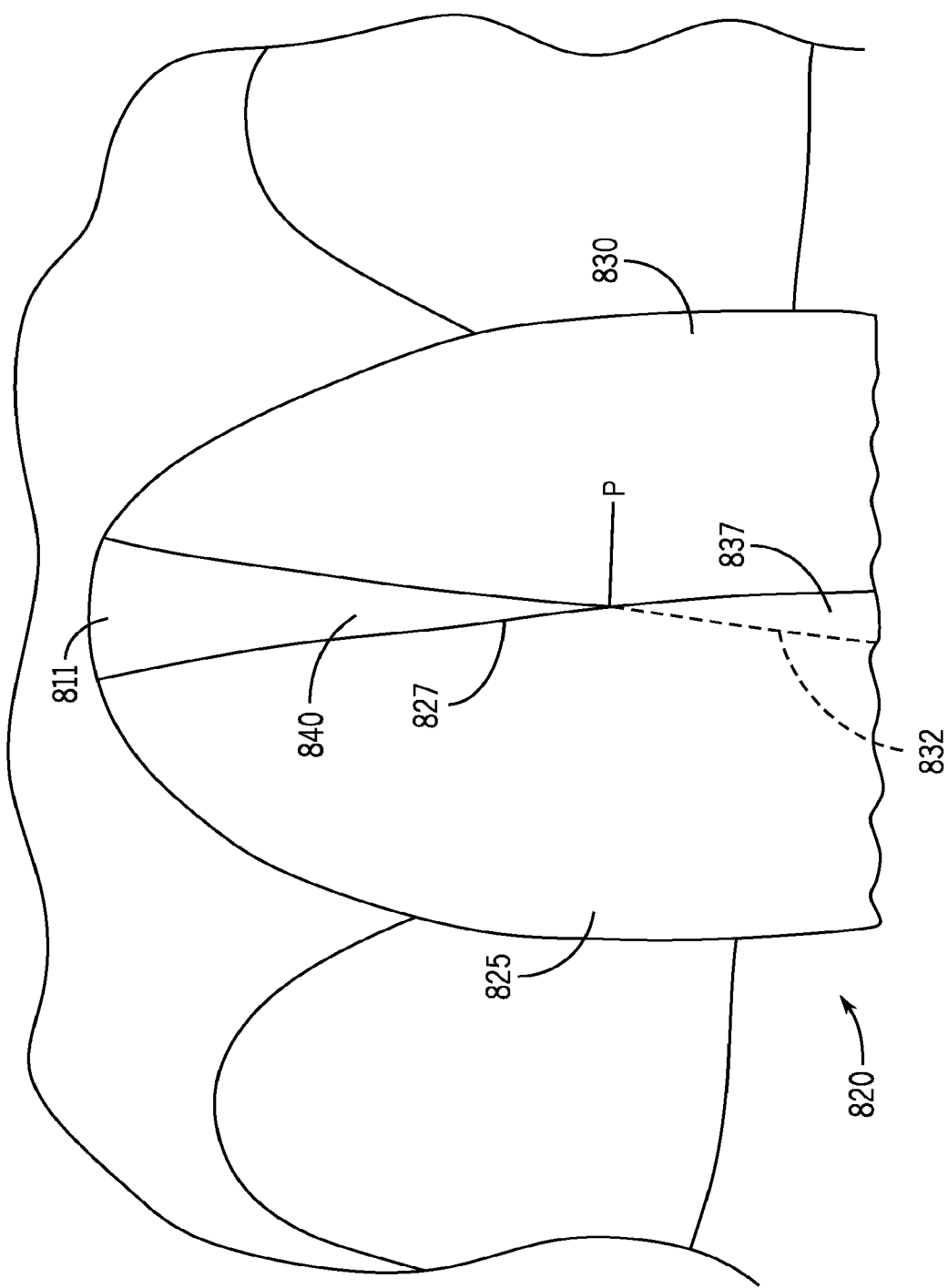
FIG. 34 shows another front view of the dental matrix system of FIG. 33.

Looking at FIG. 33, a section of the gingival edge 893 of the dental matrix 825 corresponds in shape to a portion of the gingival margin M adjacent the facial surface of the tooth. In this regard, the section of the gingival edge 893 corresponds in shape to portions of the gingival margin M on both sides of the gingival zenith Z. Alternatively, the section of the gingival edge 893 may correspond in shape to a portion of the gingival margin M on one side of the gingival zenith Z.

Figure 38:
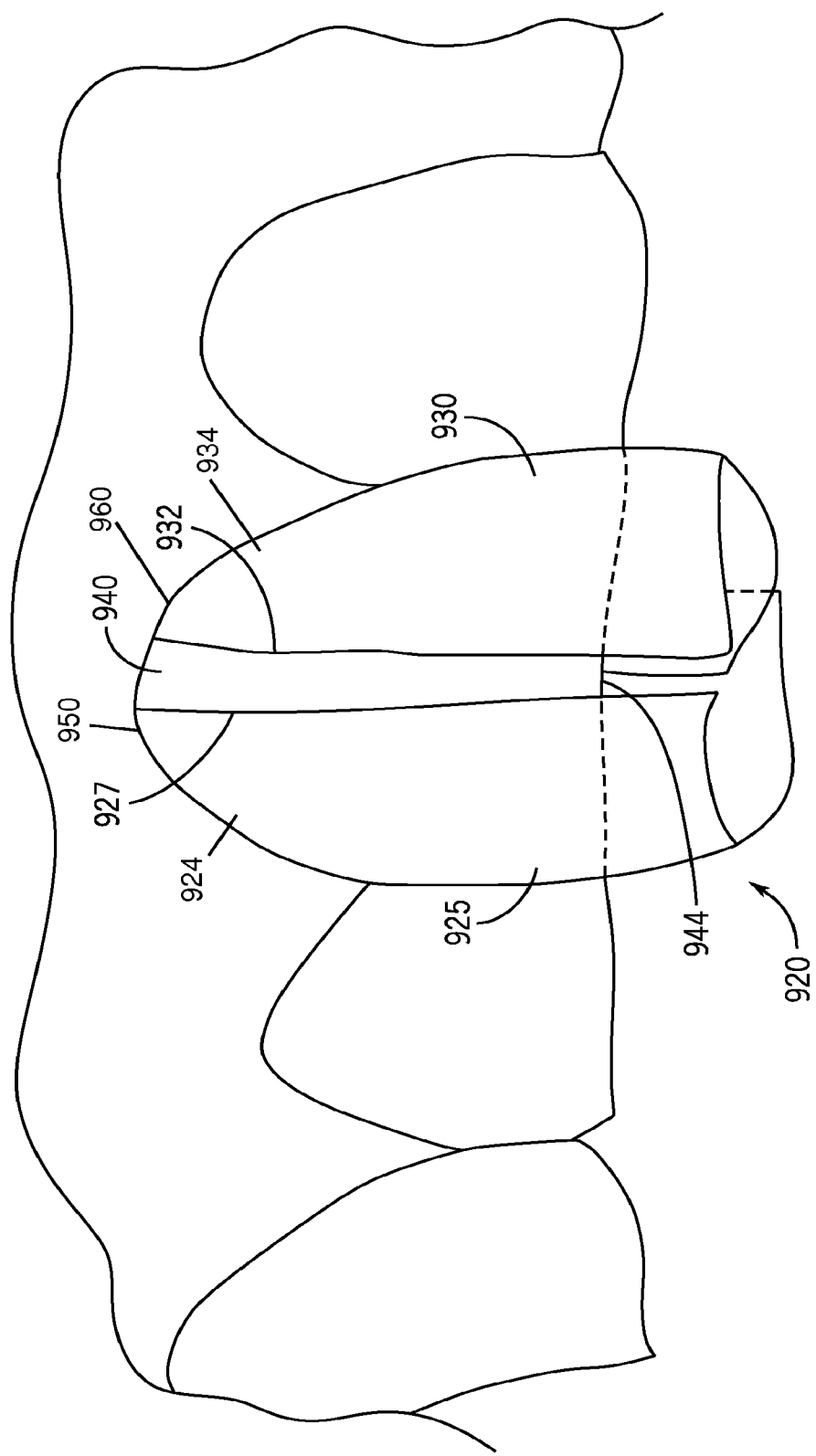
FIG. 38 shows a front view of yet another dental matrix system of the invention including a first sectional dental matrix and a second sectional dental matrix.

Referring now to FIG. 38, a front view of a non-limiting example dental matrix system 920 according to the invention is shown. An upper incisor with incisal edge 944 has a first clear sectional dental matrix 925 and a second clear sectional dental matrix 930 placed on the incisor. The dental matrices 925 and 930 can be formed from a translucent or transparent material such as a polymeric film. One non-limiting example material is the polyester film commercially available as Mylar™. The dental matrices 925 and 930 may have variable thickness such as in any of dental matrices 530, 530a, 630, 630a, and 630b. The area of thinned material may only be at the contact area between teeth. Each of the dental matrices 925 and 930 has a strip of material having a length from a first end to a second end sufficient to create a form for molding a restorative material to a surface of a tooth being restored. The length of each strip may independently surround 120 to 250 degrees of the tooth.

Each of the dental matrices 925 and 930 has a root end section 924, 934 respectively, that is anatomic in shape. The root end section 924,934 of each of the dental matrices 925 and 930 terminates at a gingival edge 950, 960 respectively. The actual anatomic shapes of the root end sections of each of the dental matrices 925 and 930 can be created from scans of natural teeth, molds of natural teeth, and/or molds of tooth models. Thus, by "anatomic", it is meant that the root end section of each of the dental matrices 925 and 930 has an inner surface that conforms to the shape of the outer surface of a particular region of the natural tooth that contacts the root end section of each of the dental matrices 925 and 930.

The side of the root end section 924 of each of the dental matrix 925 has a downward cut away (similar to the downward cut away 36 in FIG. 8) creating a gingival edge 950 that corresponds in shape to a downward projection of gingival papilla at the gingival margin adjacent the tooth and underlying periodontal and bony attachments of the tooth. The side of the root end section 934 of the dental matrix 930 can also have a downward cut away creating a gingival edge 960 (similar to gingival edge 38 in FIG. 8) that corresponds in shape to a downward projection of gingival papilla at the gingival margin adjacent the tooth and underlying periodontal and bony attachments of the tooth.

Alternatively, each of the dental matrices 925 and 930 can be used on lower teeth. In this case, the sides of the root end section of each of the dental matrices 925 and 930 has an upward cut away creating a gingival edge that corresponds in shape to an upward projection of gingival papilla at the gingival margin adjacent the tooth and underlying periodontal and bony attachments of the tooth.

The root end section of 924, 934 each of the dental matrices 925 and 930 can be fully or partially anatomic. As a result, each of the dental matrices 925 and 930 can be used without interdental wedges or elastic separators or spacers. The anatomic shape allows hands-free and wedge-free use as each of the dental matrices 925 and 930 hugs the tooth.

The dental matrix 925 has a vertical edge 927, and the dental matrix 930 has a vertical edge 932. A slot 940 is created between the vertical edge 927 and the vertical edge 932 that allows dental restorative material to flow away from the tooth when dental restorative material is injected between the dental matrices 925 and 930 and the tooth. The vertical edge 927 and the vertical edge 932 may be dimensioned to be parallel when the dental matrices 1025 and 1030 are placed on the tooth.

The two sectional matrices 925 and 930 that each cover a portion of the tooth are placed on both sides of the tooth (mesial and distal or buccal and lingual) using a pliers (as shown in FIG. 32) and together allow a full crown to be made directly with injection of composite. A one piece matrix ring cannot physically be used to form the crown unless the tooth is first ground down to a peg. The contact point of the neighboring teeth can be bypassed by lightly sanding the touch points, open to say 20 or 30 microns gap. Once inserted, a matrix at 50 microns will slide easily and push the teeth apart slightly. A second alternative is to temporarily tease the teeth apart with a dental instrument to allow passage of the matrix through the contact points.

Figure 39:
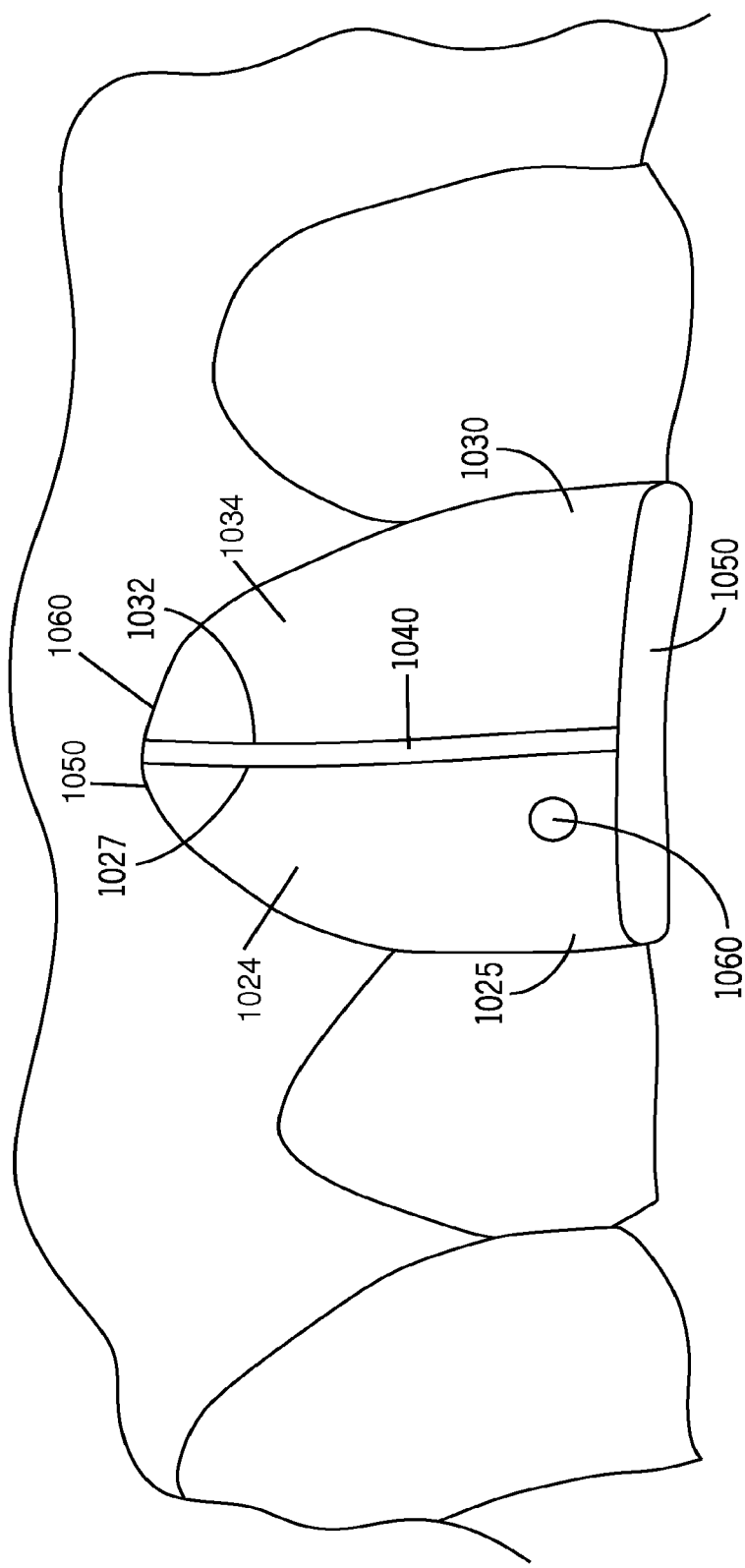
FIG. 39 shows a front view of still another dental matrix system of the invention including a first sectional dental matrix and a second sectional dental matrix and a third sectional dental matrix.

Turning now to FIG. 39, a front view of a non-limiting example dental matrix system 1020 according to the invention is shown. An upper incisor has a first clear sectional dental matrix 1025 and a second clear sectional dental matrix 1030 and a third clear sectional dental matrix 1030 placed on the incisor. The dental matrices 1025 and 1030 and 1050 can be formed from a translucent or transparent material such as a polymeric film. One non-limiting example material is the polyester film commercially available as Mylar™. The dental matrices 1025 and 1030 and 1050 may have variable thickness such as in any of dental matrices 530, 530a, 630, 630a, and 630b. Each of the dental matrices 1025 and 1030 has a strip of material having a length from a first end to a second end sufficient to create a form for molding a restorative material to a surface of a tooth being restored. The length of each strip can independently surround 120 to 250 degrees of the tooth.

Each of the dental matrices 1025 and 1030 has a root end section 1024, 1034 respectively, that is anatomic in shape. The root end section 1024, 1034 of each of the dental matrices 1025 and 1030 terminates at a gingival edge 1050, 1060 respectively. The actual anatomic shapes of the root end sections of each of the dental matrices 1025 and 1030 can be created from scans of natural teeth, molds of natural teeth, and/or molds of tooth models. Thus, by "anatomic", it is meant that the root end section of each of the dental matrices 1025 and 1030 has an inner surface that conforms to the shape of the outer surface of a particular region of the natural tooth that contacts the root end section of each of the dental matrices 1025 and 1030.

The side of the root end section 1024 of the dental matrix 1025, 1030 has a downward cut away (similar to the downward cut away 36 in FIG. 8) creating a gingival edge that corresponds in shape to a downward projection of gingival papilla at the gingival margin adjacent the tooth and underlying periodontal and bony attachments of the tooth. The side of the root end section 1034 of the dental matrix 1030 can also have a downward cut away creating a gingival edge (similar to gingival edge 38 in FIG. 8) that corresponds in shape to a downward projection of gingival papilla at the gingival margin adjacent the tooth and underlying periodontal and bony attachments of the tooth.

Alternatively, each of the dental matrices 1025 and 1030 can be used on lower teeth. In this case, the sides of the root end section 1024,1034 respectively of each of the dental matrices 1025 and 1030 has an upward cut away creating a gingival edge that corresponds in shape to an upward projection of gingival papilla at the gingival margin adjacent the tooth and underlying periodontal and bony attachments of the tooth.

The root end section 1024,1034 of each of the dental matrices 1025 and 1030 can be fully or partially anatomic. As a result, each of the dental matrices 1025 and 1030 can be used without interdental wedges or elastic separators or spacers. The anatomic shape allows hands-free and wedge-free use as each of the dental matrices 1025 and 1030 hugs the tooth.

The dental matrix 1025 has a vertical edge 1027, and the dental matrix 1030 has a vertical edge 1032. A slot 1040 may be created between the vertical edge 1027 and the vertical edge 1032 that allows dental restorative material to flow away from the tooth when dental restorative material is injected between the dental matrices 1025 and 1030 and the tooth. The vertical edge 1027 and the vertical edge 1032 may be dimensioned to be parallel (thereby creating a uniform distance between the vertical edge 1027 and the vertical edge 1032) when the dental matrices 1025 and 1030 are placed on the tooth. Alternatively, the vertical edge 1027 and the vertical edge 1032 may contact each other in abutting fashion such that no slot is formed when the dental matrices 1025 and 1030 are placed on the tooth.

The two sectional matrices 1025 and 1030 that each cover a portion of the tooth are placed on both sides of the tooth (mesial and distal or buccal and lingual) using a pliers (as shown in FIG. 32). Then, the third sectional dental matrix 1050 can be used to cover the incisal end of the dental matrices 1025 and 1030. The dental matrices 1025 and 1030 and 1050 together allow a full crown to be made by directly injecting composite through an access hole 1060 in matrix 1025 and then curing the composite. In another embodiment, the dental matrices 1025 and 1030 and 1050 are integral and the integral dental matrices 1025 and 1030 and 1050 (360 degrees) are preloaded with the composite filling/veneering material and then placed over the tooth. In yet another embodiment, a scan or impression is done preoperatively and then a matrix and/or matrices are 3-D printed or CAD ground down to make an immediate pair of matrices on site and chair side.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A dental matrix for use when placing a restorative material on an anterior tooth, the anterior tooth having a radius of curvature, the matrix comprising:
   a non-flat sectional strip having a first end and an opposite second end, the strip being shaped to conform to at least a portion of a surface of the anterior tooth, the strip being pre-curved to define a radius of curvature of the strip,
   wherein the radius of curvature of the anterior tooth is configured to interface with at least a portion of the radius of curvature of the strip when the strip is placed on the anterior tooth,
   wherein the radius of curvature of the strip is smaller than the radius of curvature of the anterior tooth prior to the strip being interfaced with the anterior tooth, and
   wherein when the strip is placed on the anterior tooth, tension is generated in the strip from the radius of curvature of the strip being smaller than the radius of curvature of the anterior tooth to retain the strip on the anterior tooth without the use of any attachment elements extending from or contacting a facial, lingual, mesial, or distal surface of the strip when the strip is placed on the anterior tooth.

2. The dental matrix of claim 1,
   wherein the strip includes a cut away inwardly directed toward a central portion of the strip, the cut away defining a first section of a gingival edge of the strip, the first section of the gingival edge of the strip including a concave portion, a first convex portion, and a second convex portion, such that the first section of the gingival edge of the strip corresponds in shape to a coronally directed projection of gingival papilla adjacent the anterior tooth.

3. The dental matrix of claim 2,
   wherein a second section of the gingival edge at least one of:

corresponds in shape to a portion of gingival margin adjacent a facial surface of the tooth;
corresponds in shape to a portion of gingival margin adjacent a facial surface of the tooth, the portion of gingival margin being on at least one side of a gingival zenith; or
corresponds in shape to a portion of gingival margin adjacent a facial surface of the tooth, the portion of gingival margin being on both sides of a gingival zenith.

4. The dental matrix of claim 1,
wherein the strip includes a first surface, and a second surface opposite the first surface,
wherein the first end of the strip is curved inwardly toward the first surface defining a first end radius and the second end of the strip is curved inwardly toward the first surface defining a second end radius, the first end radius and the second end radius being smaller than the radius of curvature of the matrix,
wherein the first end of the strip that is curved inwardly and the second end of the strip is curved inwardly are configured to generate tension to retain the matrix on the anterior tooth when the matrix is placed on the anterior tooth, and
wherein the strip is structured to be retained on the anterior tooth without the use of any attachment elements extending from or contacting a facial, lingual, mesial, or distal surface of the strip when the strip is placed on the anterior tooth.

5. The dental matrix of claim 4, wherein the first end and the second end are both curved inwardly in a non-anatomic fashion.

6. The dental matrix of claim 1, wherein the strip includes:
a first surface;
a second surface opposite the first surface;
a gingival edge; and
an occlusal edge,
wherein the first surface, the second surface, the gingival edge, and the occlusal edge define a thickness of the strip,
wherein the thickness of the strip has a thinnest region, the thinnest region being defined by a concavity directed into the first surface of the strip and a recessed area directed into the second surface of the strip, the concavity and the recessed area both being ovoid,
wherein the thinnest region is located between adjacent teeth, when the matrix is placed on the tooth, and
wherein the concavity of the first surface of the strip is configured to face the tooth, and the recessed area of the second surface of the strip is configured to face another tooth adjacent the tooth.

7. The dental matrix of claim 1, wherein a height of the strip is within a range between 10 mm and 13 mm.

8. The dental matrix of claim 1, wherein the strip comprises at least one of a metallic material, or a polymeric material.

9. The dental matrix of claim 1, wherein the strip has a thickness less than 100 microns.

10. The dental matrix of claim 1, wherein a first portion of the strip is configured to overlap with a second portion of the strip when the strip is placed on the anterior tooth.

11. The dental matrix of claim 1, wherein at least one of:
the matrix is formed by 3D printing using a scan or an impression; or
the matrix is formed by CAD grinding down using a scan or an impression.

12. A dental matrix for use when placing a restorative material on an anterior tooth, the matrix comprising:
a non-flat sectional strip having a first end, a second end opposite the first end, a first surface, and a second surface opposite the first surface, the non-flat sectional strip being shaped to conform to at least a portion of a surface of the anterior tooth, the strip being pre-curved to define a radius of curvature of the strip,
wherein the first end of the strip is curved inwardly toward the first surface defining a first end radius and the second end of the strip is curved inwardly toward the first surface defining a second end radius, the first end radius and the second end radius being smaller than the radius of curvature of the matrix,
wherein the strip is structured to be retained on the anterior tooth without the use of any attachment elements extending from or contacting a facial, lingual, mesial, or distal surface of the strip when the matrix is placed on the anterior tooth, and
wherein the first end of the strip that is curved inwardly and the second end of the strip is curved inwardly are configured to generate tension to retain the matrix on the anterior tooth when the matrix is placed on the anterior tooth.

13. The dental matrix of claim 12, wherein the strip includes a cut away inwardly directed toward a central portion of the strip, the cut away defining a first section of a gingival edge of the strip, the first section of the gingival edge of the strip including a concave portion, a first convex portion, and a second convex portion, such that the first section of the gingival edge of the strip corresponds in shape to a coronally directed projection of gingival papilla adjacent the anterior tooth.

14. The dental matrix of claim 12,
wherein a radius of curvature of the anterior tooth is configured to interface with at least a portion of the radius of curvature of the strip when the strip is placed on the anterior tooth,
wherein the radius of curvature of the strip is smaller than the radius of curvature of the anterior tooth prior to the strip being interfaced with the anterior tooth, and
wherein when the strip is placed on the anterior tooth, tension is generated in the strip from the radius of curvature of the strip being smaller than the radius of curvature of the anterior tooth to retain the strip on the anterior tooth without the use of any attachment elements extending from or contacting a facial, lingual, mesial, or distal surface of the strip when the strip is placed on the anterior tooth.

15. The dental matrix of claim 12, wherein at least a section of the gingival edge of the strip is curved inwardly towards the first surface of the strip and is configured to provide tension to retain the matrix onto the anterior tooth once the matrix snaps onto the anterior tooth.

16. The dental matrix of claim 12, wherein the strip is at least one of transparent, or translucent.

17. A dental matrix comprising:
a strip that is pre-curved to define a radius of curvature of the strip, the strip comprising a first end, a second end opposite the first end, a first surface, and a second surface opposite the first surface,
wherein the strip is configured to interface with at least a portion of a radius of curvature of a tooth when the strip is placed on the tooth,
wherein the strip is structured to be retained on the tooth without the use of any attachment elements extending from or contacting a facial, lingual, mesial, or distal surface of the strip when the matrix is placed on the tooth, and wherein at least one of:
- the radius of curvature of the strip is smaller than the radius of curvature of the tooth prior to the strip being interfaced with the tooth, and when the strip is placed on the tooth, tension is generated in the strip from the radius of curvature of the strip being smaller than the radius of curvature of the tooth to retain the strip on the tooth; or
- the first end of the strip is curved inwardly toward the first surface defining a first end radius and the second end of the strip is curved inwardly toward the first surface defining a second end radius, the first end radius and the second end radius being smaller than the radius of curvature of the matrix, and the first end of the strip that is curved inwardly and the second end of the strip is curved inwardly are configured to generate tension to retain the matrix on the tooth when the matrix is placed on the tooth.

18. The dental matrix of claim 17, wherein the strip includes a cut away inwardly directed toward a central portion of the strip, the cut away defining a first section of a gingival edge of the strip, the first section of the gingival edge of the strip including a concave portion, a first convex portion, and a second convex portion, such that the first section of the gingival edge of the strip corresponds in shape to a coronally directed projection of gingival papilla adjacent the tooth.

19. The dental matrix of claim 17, wherein a first portion of the strip is configured to overlap with a second portion of the strip when the strip is placed on the tooth.

20. The dental matrix of claim 17, wherein at least one of:
- the matrix is formed by 3D printing using a scan or an impression; or
- the matrix is formed by CAD grinding down using a scan or an impression.

\* \* \* \* \*